(12) United States Patent
Yoshii

(10) Patent No.: US 10,852,599 B2
(45) Date of Patent: Dec. 1, 2020

(54) SUBSTRATE FOR ELECTRO-OPTICAL DEVICE, INDIVIDUAL SUBSTRATE, ELECTRO-OPTICAL DEVICE, ELECTRONIC APPARATUS, AND METHOD FOR MANUFACTURING SUBSTRATE FOR ELECTRO-OPTICAL DEVICE

(71) Applicant: SEIKO EPSON CORPORATION, Tokyo (JP)

(72) Inventor: Masahito Yoshii, Matsumoto (JP)

(73) Assignee: SEIKO EPSON COPRORATION, Tokyo (JP)

( * ) Notice: Subject to any disclaimer, the term of this patent is extended or adjusted under 35 U.S.C. 154(b) by 0 days.

(21) Appl. No.: 16/503,729

(22) Filed: Jul. 5, 2019

(65) Prior Publication Data
US 2020/0012161 A1 Jan. 9, 2020

(30) Foreign Application Priority Data
Jul. 6, 2018 (JP) .................................. 2018-128838

(51) Int. Cl.
*G02F 1/1362* (2006.01)
(52) U.S. Cl.
CPC .. *G02F 1/136204* (2013.01); *G02F 1/136286* (2013.01)
(58) Field of Classification Search
CPC ................................................ G02F 1/136204
See application file for complete search history.

(56) References Cited

U.S. PATENT DOCUMENTS

| 6,175,394 B1 * | 1/2001 | Wu ................... G02F 1/136204 257/360 |
| 2012/0211756 A1 | 8/2012 | Tanahara |
| 2015/0213763 A1 * | 7/2015 | Ota ........................ G09G 3/006 345/211 |
| 2018/0046012 A1 * | 2/2018 | Miyamoto ........ G02F 1/133345 |

FOREIGN PATENT DOCUMENTS

| JP | H09-297321 A | 11/1997 | |
| JP | H09297321 | * 11/1997 | ............. G02F 1/136 |
| JP | H09-329796 A | 12/1997 | |
| JP | H11-282386 A | 10/1999 | |
| JP | 2003-248235 A | 9/2003 | |
| JP | 2012-014098 A | 1/2012 | |
| JP | 2012014098 | * 1/2012 | ........... G02F 1/1368 |
| JP | 2012-173621 A | 9/2012 | |
| JP | 2014-186085 A | 10/2014 | |
| JP | 2017-078793 A | 4/2017 | |
| JP | 2017078793 | * 4/2017 | ........... G02F 1/1345 |

* cited by examiner

*Primary Examiner* — Sang V Nguyen
(74) *Attorney, Agent, or Firm* — Oliff PLC

(57) ABSTRACT

A chip serving as an individual substrate includes an internal circuit, and an external coupling terminal serving as a first coupling terminal arranged on a first side of the chip. One end side of the external coupling terminal is electrically coupled, via a first electrostatic protection circuit, to a guard line serving as a first common wiring extending along the first side, and another end side is electrically coupled to the internal circuit via a coupling wiring serving as a first coupling wiring. An internal circuit side of the coupling wiring is electrically coupled, via a second electrostatic protection circuit, to a guard line serving as a second common wiring extending along a second side intersecting the first side.

12 Claims, 10 Drawing Sheets

SUBSTRATE FOR ELECTRO-OPTICAL DEVICE, INDIVIDUAL SUBSTRATE, ELECTRO-OPTICAL DEVICE, ELECTRONIC APPARATUS, AND METHOD FOR MANUFACTURING SUBSTRATE FOR ELECTRO-OPTICAL DEVICE

The present application is based on, and claims priority from JP Application Serial Number 2018-128838, filed Jul. 6, 2018, the disclosure of which is hereby incorporated by reference herein in its entirety.

BACKGROUND

1. Technical Field

The disclosure relates to a substrate for an electro-optical device, an individual substrate, an electro-optical device, an electronic apparatus, and a method for manufacturing a substrate for an electro-optical device.

2. Related Art

As an electro-optical device, an active drive type liquid crystal device including a pixel electrode and a transistor as a switching element for each of a plurality of pixels is known. Examples include a liquid crystal device including a peripheral circuit for driving a pixel in a peripheral region surrounding a display region in which a plurality of pixels are arranged. A transistor is also included in the peripheral circuit, and measures are taken to reduce a problem that the transistor is damaged by static electricity generated in a manufacturing process of the liquid crystal device.

For example, JP-A-2003-248235 discloses a method for manufacturing a liquid crystal display device, the method including filling an area between a thin film transistor (TFT) array substrate including a thin film transistor (TFT), and a counter substrate with liquid crystal. The TFT array substrate is formed by separating a plurality of TFT array circuits formed on one substrate. A short ring encompassing the TFT array and a shunt wiring formed on an outer periphery of the TFT array circuit are formed on the one substrate and a wiring portion (discharging protrusion) protruding toward the other side is formed on at least one of the short ring and the shunt wiring.

According to JP-A-2003-248235, even when static electricity is generated during handling in the manufacture of the one substrate, and a surge occurs in a scanning line or a signal line coupled to the shunt wiring, the surge can be dissipated from the shunt wiring to the short ring via the wiring portion (discharge protrusion) described above. That is, the TFT array circuit can be protected from static electricity in the manufacturing process of the TFT array substrate.

Furthermore, for example, JP-A-2014-186085 discloses a method for manufacturing a circuit board including a first step of forming a circuit portion and a reactance element corresponding to the circuit portion for each of a plurality of circuit boards of a mother substrate, a second step of forming a wiring that electrically couples the circuit portion and another circuit portion adjacent to the circuit portion via the reactance element, and a third step of dividing the circuit board from the mother substrate. In the third step, a wiring formed between the circuit portion and the reactance element is cut.

According to JP-A-2014-186085, in the manufacture of the circuit board, static electricity accumulated in the circuit portion can be released and diffused to the reactance element and the wiring formed in the second step, thus the static electricity accumulated in the circuit portion can be prevented to be discharged to other circuit portions and electrostatically destroy the other circuit portions. Furthermore, the reactance element can release the static electricity accumulated in the circuit portion even when a resistance value is not optimized as in a resistive wiring.

According to JP-A-2003-248235, wiring leading to the shunt wiring is cut to take out the TFT array circuit from the one substrate and, in JP-A-2014-186085, wiring electrically coupled to the circuit portion via the reactance element is cut to take out the circuit portion from the mother substrate. The cutting is performed along four sides of the TFT array circuit or the circuit portion, resulting in the problem that, when static electricity is generated when cutting along one side, static electricity may enter the interior from the wiring arrayed along that side, causing an element such as a transistor included in the TFT array circuit or the circuit portion or a wiring coupled to the element to be electrostatically destroyed.

SUMMARY

A substrate for an electro-optical device according to an aspect of the present disclosure is a substrate for an electro-optical device including a plurality of individual substrates arranged in a first direction and a second direction intersecting the first direction. At least one individual substrate among the plurality of individual substrates includes an internal circuit and a first coupling terminal arranged at a first side of the individual substrate. One end side of the first coupling terminal is electrically coupled, via a first electrostatic protection circuit, to a first common wiring extending along the first side, and another end side of the first coupling terminal is electrically coupled, via a first coupling wiring, to the internal circuit. The first coupling wiring is electrically coupled, via a second electrostatic protection circuit, to a second common wiring extending along a second side intersecting the first side.

In the substrate for an electro-optical device or the like described above, the individual substrate further includes a second coupling terminal arranged at the second side of the individual substrate. One end side of the second coupling terminal is electrically coupled, via a third electrostatic protection circuit, to the second common wiring extending along the second side, and another end side of the second coupling terminal is electrically coupled, via a second coupling wiring, to the internal circuit. The second coupling wiring is electrically coupled, via a fourth electrostatic protection circuit, to a third common wiring extending along a third side intersecting the second side.

In the substrate for an electro-optical device described above, the first coupling terminal is an external coupling terminal configured to couple to an external circuit, and the second coupling terminal is an inspection terminal configured to inspect the internal circuit.

In the substrate for an electro-optical device described above, the first common wiring and the second common wiring may be electrically coupled.

In the substrate for an electro-optical device described above, the first common wiring, the second common wiring, and the third common wiring may be electrically coupled.

In the substrate for an electro-optical device described above, at least one of the first electrostatic protection circuit, the second electrostatic protection circuit, the third electrostatic protection circuit, and the fourth electrostatic protection circuit may be a resistive element, and a resistance value of the resistive element may be greater than a resistance value of the first coupling wiring or the second coupling wiring.

In the substrate for an electro-optical device described above, the resistive element is formed, on a base material, in a same layer using a same material as a semiconductor layer of a transistor included in the internal circuit.

In the substrate for an electro-optical device described above, the first common wiring, the second common wiring, and the third common wiring are formed, on a base material, in a same layer using a same material as a gate electrode of a transistor included in the internal circuit.

An individual substrate according to an aspect of the present disclosure includes an internal circuit provided on a base material, a first coupling terminal arranged at a first side of the base material, a first coupling wiring electrically coupling the internal circuit and the first coupling terminal, a first electrostatic protection circuit that is arranged between the first coupling terminal and the first side, that is electrically coupled, on one end side thereof, to the first coupling terminal, and that is cut on another end thereof at the first side, and a second electrostatic protection circuit that is arranged at a second side intersecting the first side, that is electrically coupled, on one end side thereof, to the first coupling wiring, and that is cut on another end thereof at the second side.

An electro-optical device according to an aspect of the present disclosure includes an individual substrate taken out from the substrate for an electro-optical device described above, a counter substrate, and an electro-optical element arranged between the individual substrate and the counter substrate.

Another electro-optical device according to an aspect of the present disclosure includes the individual substrate described above, a counter substrate, and an electro-optical element arranged between the individual substrate and the counter substrate.

An electronic apparatus according to an aspect of the present disclosure includes the above-described electro-optical device.

A method for manufacturing a substrate for an electro-optical device according to an aspect of the present disclosure is a method for manufacturing a substrate for an electro-optical device, the substrate including a plurality of individual substrates arranged in a first direction and a second direction intersecting the first direction. At least one individual substrate amoung the plurality of individual substrates includes an internal circuit and a plurality of first coupling terminals arranged on a first side of the individual substrate. One end side of each of the plurality of first coupling terminals is electrically coupled, via a first electrostatic protection circuit, to a first common wiring extending along the first side, and another end side of each of the plurality of first coupling terminals is electrically coupled via a first coupling wiring, to the internal circuit. The first coupling wiring is electrically coupled, via a second electrostatic protection circuit, to a second common wiring extending along a second side intersecting the first side. The method includes cutting the first electrostatic protection circuit along the second direction and cutting the second electrostatic protection circuit along the first direction to take out the individual substrate.

DESCRIPTION OF EXEMPLARY EMBODIMENTS

Figure 1:
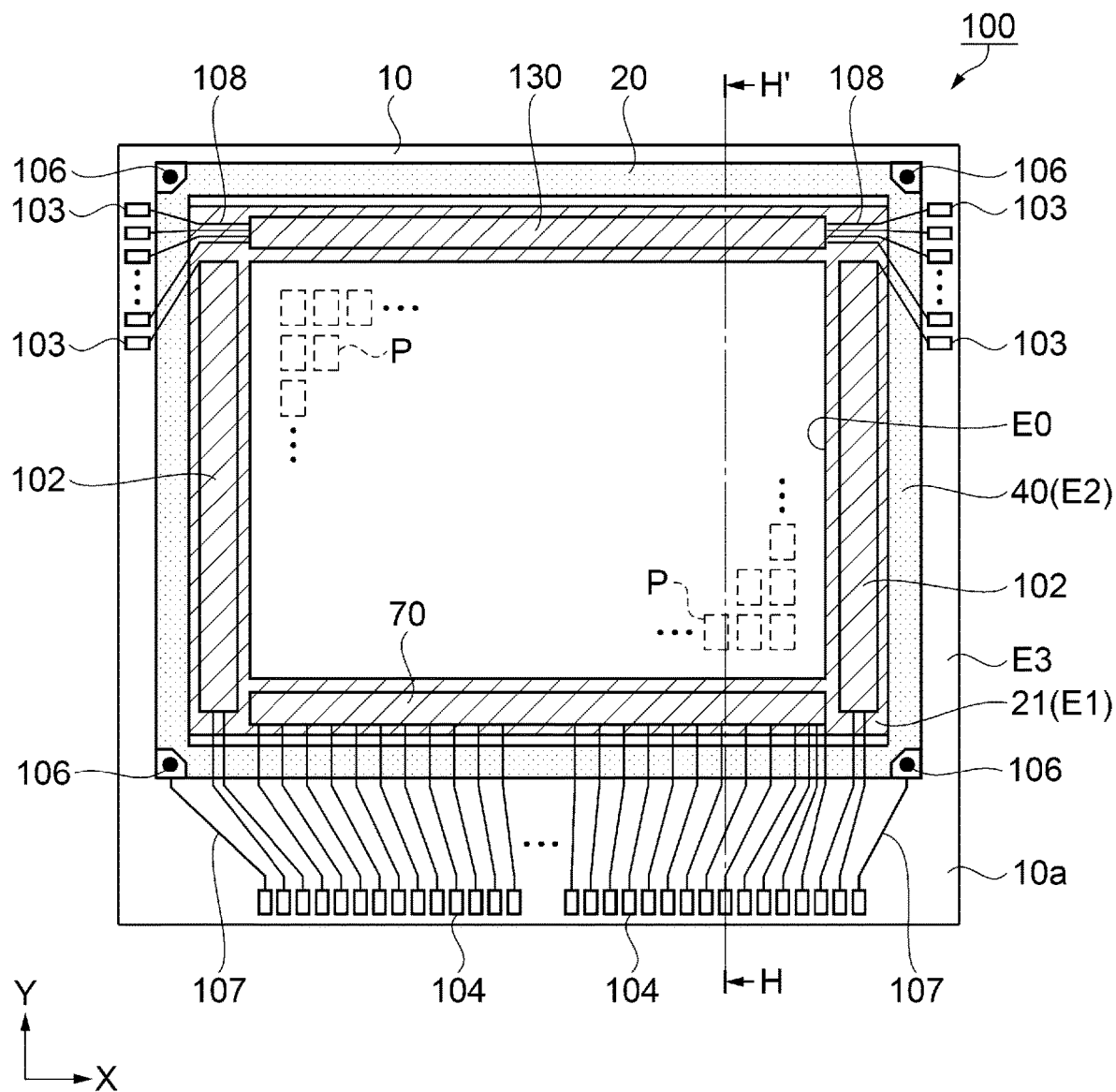
FIG. 1 is a schematic plan view illustrating a configuration of a liquid crystal device of First Exemplary Embodiment.

Exemplary embodiments of the present disclosure will be described below with reference to the accompanying drawings. Note that, in the drawings referred to below, the parts described are illustrated in an enlarged or reduced state as appropriate so that those parts can be easily recognized.

First Exemplary Embodiment

Electro-Optical Device

An electro-optical device of the present exemplary embodiment will be described by taking, as an example, an active matrix liquid crystal device including a Thin Film Transistor (TFT) as a switching element of a pixel. This liquid crystal device is a small display that can be used favorably as a light modulation means (light valve) of, for example, a projection-type display device (projector) described later.

First, a basic configuration of a liquid crystal device as an electro-optical device of the present exemplary embodiment will be described with reference to FIG. 1 and FIG. 2. FIG. 1 is a schematic plan view illustrating a configuration of a liquid crystal device of First Exemplary Embodiment, and FIG. 2 is a schematic cross-sectional view illustrating a structure of the liquid crystal device of First Exemplary Embodiment taken along line H-H' in FIG. 1.

Figure 2:
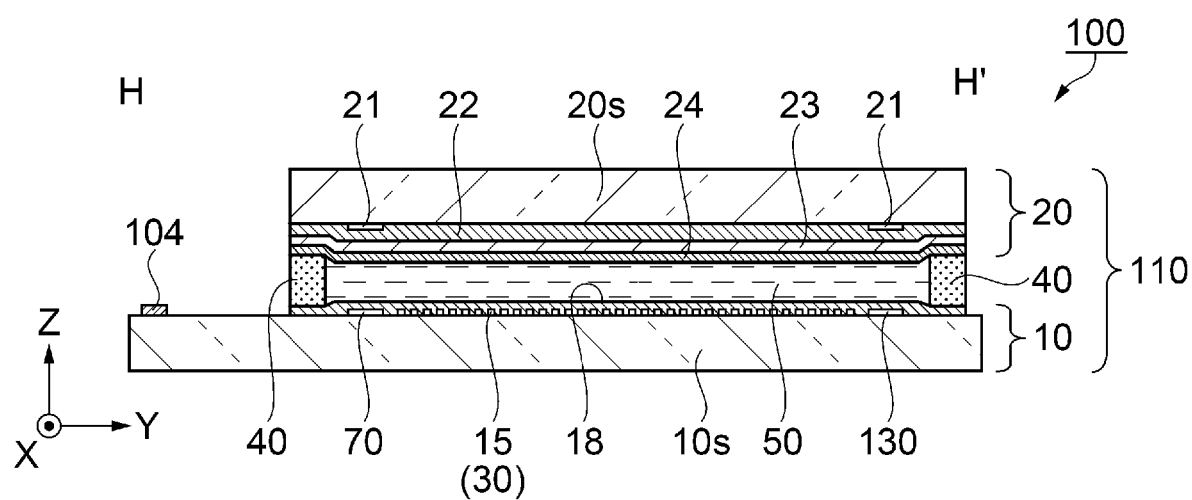
FIG. 2 is a schematic cross-sectional view of a structure of the liquid crystal device of First Exemplary Embodiment taken along line H-H' in FIG. 1.

As illustrated in FIG. 1 and FIG. 2, a liquid crystal device 100 serving as the electro-optical device of First Exemplary Embodiment includes an element substrate 10 and a counter substrate 20 disposed opposite to each other, and a liquid crystal layer 50 as the electro-optical device sandwiched by a pair of these substrates. For example, a quartz substrate or a glass substrate having a translucent property is used for each of a base material 10s of the element substrate 10 and a base material 20s of the counter substrate 20.

The element substrate 10 is slightly larger than the counter substrate 20, both substrates are bonded to each other via a seal portion 40 disposed in a frame-like shape, and liquid crystal having positive or negative dielectric anisotropy is encapsulated in a gap between the element substrate 10 and the counter substrate 20 to constitute the liquid crystal layer 50. As the seal portion 40, for example, an adhesive such as a thermosetting or ultraviolet curable epoxy resin is employed. The seal portion 40 is mixed with a spacer (not illustrated) configured to keep an interval between the pair of substrates constant.

A partition portion 21 is similarly arranged in a frame-like shape on an inside of the seal portion 40 disposed in a frame-like shape. The partition portion 21 is formed from, for example, a light blocking metal or a metal compound, and an inside of the partition portion 21 is a display region E0 including a plurality of pixels P. Note that the display region E0 may include dummy pixels arranged to surround the plurality of pixels P in addition to the plurality of pixels P contributing to display. In addition, although not illustrated in FIG. 1, a light blocking portion that divides each of the plurality of pixels P in a planar manner is disposed in the display region E0.

In the exemplary embodiment, a peripheral region from an edge of the display region E0 to an outer edge of the element substrate 10 is segmented and referred to as follows. A region provided with the partition portion 21 surrounding the display region E0 is referred to as a first peripheral region E1, a region provided with the seal portion 40 on an outside of the first peripheral region E1 is referred to as a second peripheral region E2, and a region on an outside of the second peripheral region E2 leading to the outer edge of the element substrate 10 is referred to as a third peripheral region E3.

A plurality of external coupling terminals 104 are arrayed on one side portion of the element substrate 10 protruding outward from the counter substrate 20. The portion in which the plurality of external coupling terminals 104 are arrayed is referred to as a terminal portion 10a. In the first peripheral region E1, a demultiplexer circuit 70 is provided between the seal portion 40 along the terminal portion 10a of the element substrate 10, and the display region E0. In addition, an inspection circuit 130 is provided between the seal portion 40 along another one side portion facing the terminal portion 10a, and the display region E0. Furthermore, a scanning line drive circuit 102 is provided between the seal portion 40 along two other sides orthogonal to the terminal portion 10a and opposite to each other, and the display region E0. The demultiplexer circuit 70, the scanning line drive circuit 102, and the inspection circuit 130 are collectively referred to as a peripheral circuit.

In the third peripheral region E3, a coupling wiring 107 coupled to the demultiplexer circuit 70 and the scanning line drive circuit 102 is coupled to the plurality of external coupling terminals 104 arrayed in the terminal portion 10a. Further, a coupling wiring 108 coupled to the inspection circuit 130 is coupled to inspection terminals 103 arrayed on the two other sides orthogonal to the terminal portion 10a and facing each other. The plurality of external coupling terminals 104 are each an example of the first coupling terminal of the disclosure, and the plurality of inspection terminals 103 are each an example of the second coupling terminal of disclosure. A detailed configuration of the plurality of the plurality of external coupling terminals 104, the coupling wiring 107 coupled to these, the plurality of inspection terminals 103, the coupling wiring 108 coupled to these, and the like are described later.

Note that the internal circuit in the disclosure includes a peripheral circuit including the demultiplexer circuit 70, the scanning line drive circuit 102, and the inspection circuit 130, and the coupling wiring coupled to this peripheral circuit. Further, the plurality of inspection terminals 103 include an input terminal for inputting an input signal for inspecting according to an inspection of the demultiplexer circuit 70 and the scanning line drive circuit 102 of the internal circuit, and an output terminal for outputting an output signal for inspecting. A detailed configuration of the plurality of inspection terminals 103 will be described later.

Hereinafter, a direction along the terminal portion 10a is referred to as an X direction, and a direction along the other two sides orthogonal to the terminal portion 10a and facing each other is referred to as a Y direction. Further, a direction orthogonal to a plane defined by the X direction and the Y direction is referred to as a Z direction. Furthermore, a view taken along the Z direction from the counter substrate 20 side is referred to as a plan view. The X direction, the Y direction, and the Z direction in the drawings referred to below are directions corresponding to the X direction, the Y direction, and the Z direction in FIG. 1 and FIG. 2. The X direction is an example of a first direction of the disclosure, and the Y direction is an example of a second direction of the present disclosure.

As illustrated in FIG. 2, a light-transmitting pixel electrode 15 and a thin film transistor (hereinafter referred to as TFT) 30 that is a switching element, provided for each pixel P, a signal wiring, and an alignment film 18 covering these are formed on a surface of the element substrate 10 on the liquid crystal layer 50 side. In addition, a light blocking structure is adopted that prevents light from entering a semiconductor layer of the TFT 30 and destabilizing a switching operation. The element substrate 10 is an example of an individual substrate in the disclosure, and includes the base material 10s, and the pixel electrode 15, the TFT 30, the signal wiring, the alignment film 18, and the like provided on the base material 10s.

The partition portion 21, a planarization layer 22 formed so as to cover the partition portion 21, a common electrode 23 provided covering the planarization layer 22, and an alignment film 24 covering the common electrode 23 are provided on a surface of the counter substrate 20 on the liquid crystal layer 50 side. The counter substrate 20 includes the base material 20s, and the partition portion 21, the planarization layer 22, the common electrode 23, the alignment film 24, and the like provided on the base material 20s.

The partition portion 21 is provided in a frame-like shape at a position overlapping the demultiplexer circuit 70, the scanning line drive circuit 102, and the inspection circuit 130 in a plan view as illustrated in FIG. 1. As a result, the partition portion 21 serves to block light incident from the counter substrate 20 side, and prevents erroneous operation due to the light of the peripheral circuit, including these driving circuits. In addition, the partition portion 21 blocks light to prevent unnecessary stray light from being incident on the display region E0, and ensures high contrast in display of the display region E0.

The planarization layer 22 includes, for example, an inorganic material such as a silicon oxide, has a translucent property, and is provided to cover the partition portion 21. Examples of the method of forming the planarization layer 22 include a film formation method using, for example, a plasma CVD method or the like.

The common electrode 23 is made of a transparent conductive film such as an Indium Tin Oxide (ITO) film, for example, and is provided covering the planarization layer 22. As illustrated in FIG. 1, the common electrode 23 is electrically coupled to the external coupling terminals 104 via upper and lower conduction portions 106 provided at the four corners of the counter substrate 20 and the coupling wiring 107 on the element substrate 10 side.

The alignment film 18 covering the pixel electrode 15 and the alignment film 24 covering the common electrode 23 are selected based on an optical design of the liquid crystal device 100. Examples include an organic alignment film, such as polyimide, for example, in which an alignment treatment is performed to substantially horizontally align liquid crystal molecules having positive dielectric anisotropies, and inorganic alignment films such as silicon oxide (SiOx) deposited using a vapor phase epitaxy method that substantially vertically aligns liquid crystal molecules having negative dielectric anisotropies.

Such a liquid crystal device 100 is of a transmissive-type and, the design employed is an optical design of a normally white mode in which the transmittance of the pixel P is the maximum while voltage is not applied, and a normally black mode in which the transmittance of the pixel P is the minimum while voltage is not applied. A polarizing element is disposed on each of a light incidence side and a light exit side of a liquid crystal panel 110 including the element substrate 10 and the counter substrate 20, in accordance with the optical design. Note that in the exemplary embodiment, the normally black mode is employed.

Figure 3:
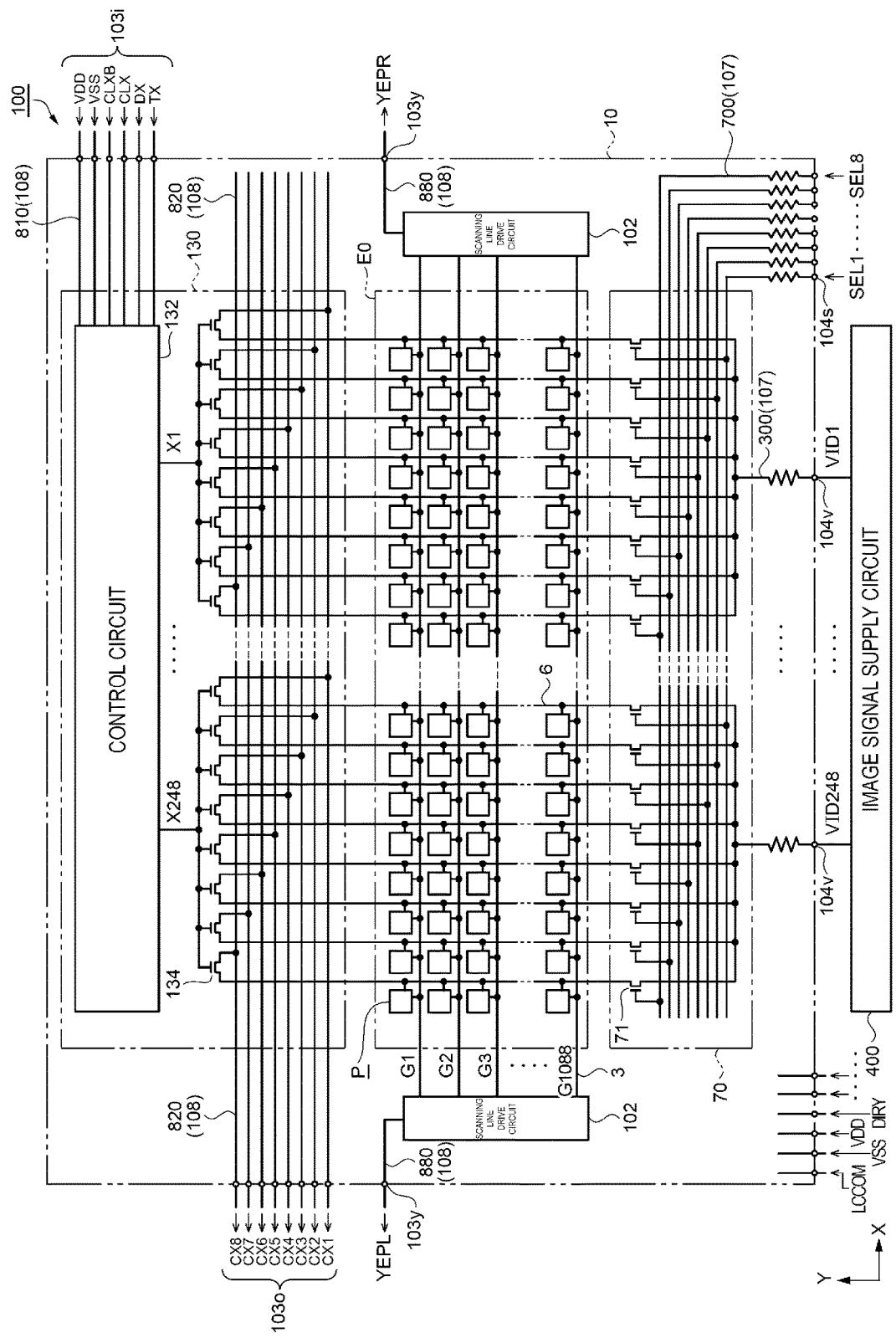
FIG. 3 is a circuit block diagram illustrating an electrical configuration of the liquid crystal device of First Exemplary Embodiment.
Figure 4:
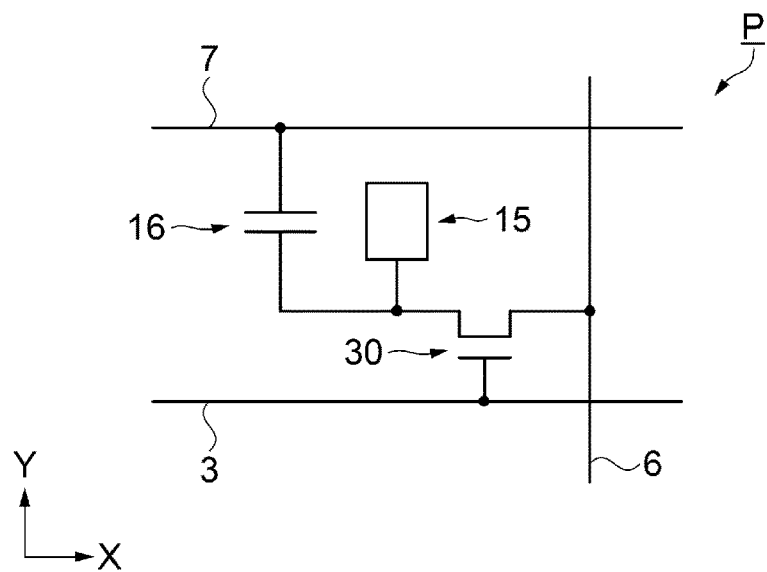
FIG. 4 is an equivalent circuit diagram of a pixel of the liquid crystal device of First Exemplary Embodiment.

Next, an electrical configuration of the liquid crystal device 100 according to the exemplary embodiment will be described with reference to FIG. 3 and FIG. 4. FIG. 3 is a circuit block diagram illustrating an electrical configuration of the liquid crystal device of First Exemplary Embodiment, and FIG. 4 is an equivalent circuit diagram of a pixel of the liquid crystal device of First Exemplary Embodiment.

As illustrated in FIG. 3, the liquid crystal device 100 includes the demultiplexer circuit 70, the scanning line drive circuit 102, and the inspection circuit 130 on the element substrate 10. An image signal supply circuit 400 serving as an external circuit is electrically coupled to an image signal terminal 104v of the plurality of external coupling terminals 104 of the element substrate 10.

The display region E0 of the element substrate 10 is provided so that 1,088 scanning lines 3 extend in a row direction (that is, the X direction), for example. In addition, 1,984 (=248×8) data lines 6 grouped in groups of eight are provided so as to extend in a columnar direction (that is, the Y direction). The scanning lines 3 and the data lines 6 are provided so as to maintain mutual electrical insulation. Note that the number of the scanning lines 3 is not limited to 1088, and the number of the data lines 6 is also not limited to 1984. While the number of the data lines 6 constituting one group is eight in the exemplary embodiment, the number may be two or greater, and may be, for example, ten.

The pixels P are respectively arrayed in correspondence with the intersections of the 1088 scanning line 3 and the 1984 data lines 6. Thus, in the exemplary embodiment, the pixels P are arrayed in a matrix with a predetermined pixel pitch in 1088 vertical rows×1984 horizontal columns.

As illustrated in FIG. 4, the pixel P includes the TFT 30 for pixel switching, the pixel electrode 15, and a holding capacitor 16.

In the TFT 30, the source is electrically coupled to the data line 6, the gate is electrically coupled to the scanning line 3, and the drain is electrically coupled to the pixel electrode 15. The holding capacitor 16 is coupled between the drain of the TFT 30 and the capacitance line 7. The TFT 30 is switched on and off by a scanning signal supplied from the scanning line drive circuit 102.

In the pixel P, the image signal at a predetermined level written in the liquid crystal layer 50 via the data line 6 and pixel electrode 15 is held for a certain period between the pixel electrode 15 and the common electrode 23. A modulation of the light allows the liquid crystal layer 50 to perform grayscale display when the alignment of liquid crystal molecules varies in accordance with the applied voltage level. In the normally white mode, the transmittance for incident light decreases in accordance with the voltage applied in each pixel P, and in the normally black mode, the transmittance for incident light increases in accordance with the voltage applied in each pixel P. Further, light having contrast in accordance with the image signal is emitted from the liquid crystal device 100 as a whole.

To prevent the image signals held from leaking, the holding capacitor 16 is added in parallel with liquid crystal capacitance formed between the pixel electrode 15 and the common electrode 23.

The pixels P as described above are arrayed in a matrix in the display region E0 to enable active matrix driving.

Referring back to FIG. 3, in the exemplary embodiment, eight data lines 6 constituting one group may be referred to as a-series, b-series, c-series, e-series, f-series, g-series, and h-series data lines 6 sequentially from the right, for the purpose of distinguishing them from one another. Specifically, the a-series corresponds to the 1st, 9th, 17th, . . . , and 1977th data lines 6, the b-series corresponds to the 2nd, 10th, 18th, . . . , and 1978th data lines 6, the c-series corresponds to the 3rd, 11th, 19th, . . . , and 1979th data lines 6, the d-series corresponds to the 4th, 12th, 20th, . . . , and 1980th data lines 6, the e-series corresponds to the 5th, 13th, 21st, . . . , and 1981st data lines 6, the f-series corresponds to the 6th, 14th, 22nd, . . . , and 1982nd data lines 6, the g-series corresponds to the 7th, 15th, 23rd, . . . , and 1983rd data lines 6, and the h-series corresponds to the 8th, 16th, 24th, . . . , and 1984th data lines 6.

The scanning line drive circuit 102 includes a shift register, and supplies scanning signals G1, G2, and G3, . . . , and G1088 to the 1st, 2nd, 3rd, and 1088th scanning lines 3, respectively. Specifically, while the scanning line drive circuit 102 sequentially selects the 1st, 2nd, 3rd, . . . , 1088th scanning lines 3 for a period of one frame, it sets the level of a scanning signal to be supplied to the selected scanning line 3 to a high level H corresponding to a selected voltage, and sets a level of scanning signals to be supplied to other scanning lines 3 to a low level L corresponding to a non-selected voltage.

The image signal supply circuit 400 is configured separately from the element substrate 10, and is coupled to the element substrate 10 via the image signal terminal 104v at the time of the display operation. The image signal supply circuit 400 outputs an image signal of a voltage corresponding to the gradation of the pixel P in which the pixel electrode 15 is included to the pixel electrode 15 corresponding to the data line 6 selected by the scanning line drive circuit 104 and one of eight data lines 6 belonging to each group selected by the demultiplexer circuit 70. The image signal supplied from the image signal supply circuit 400 to the image signal terminal 104v is supplied to the demultiplexer circuit 70 via an image signal line 300 included in the coupling wiring 107 (see FIG. 1).

On the other hand, during inspection, instead of the image signal supply circuit 400, an inspection image signal supply circuit (not illustrated) is coupled, and an image signal for inspection is supplied to the image signal terminal 104v in accordance with the inspection operation.

Note that, in the present exemplary embodiment, as described above, the number of data lines 6 is "1984", and these data lines 6 are divided into groups of eight data lines 6 respectively, thus the number of the image signal terminals 104v is "248".

The demultiplexer circuit 70 is configured to include a transistor 71 provided per data line 6. The transistor 71 is, for example, an n-channel type, and each drain is electrically coupled to one end of the data line 6. The sources of the eight transistors 71 corresponding to the data lines 6 belonging to a same group are electrically coupled in common with the image signal line 300 corresponding to the group.

That is, the m-th (however, m is any integer of 1 or more but not greater than 248, counted from the right in FIG. 3) group of the data lines 6 a is configured of an (8m−7)th data line 6 of the a-series, an (8m−6)th data line 6 of the b-series, an (8m−5)th data line 6 of the c-series, an (8m−4)th data line 6 of the d-series, an (8m−3)th data line 6 of the e-series, an (8m−2)th data line 6 of the f-series, an (8m−1)th data line 6 of the g-series, and an (8m)th data line 6 of the h-series. Thus, the sources of the transistors 71 corresponding to the group of eight data lines 6 are electrically coupled in common to supply an image signal VID (m). A control signal SEL1 is supplied through a control signal line 700 included in the coupling wiring 107 (see FIG. 1) to the gate of the transistor 71 corresponding to the (8m−7)th data line 6. Similarly, control signals SEL2 to SEL8 are supplied through the control signal line 700 to the gates of the transistors 71 corresponding to the (8m−6)th data line 6, the (8m−5)th data line 6, the (8m−4)th data line 6, the (8m−3)th data line 6, the (8m−2)th data line 6, the (8m−1)th data line 6, and the (8m)th data line 6. The control signals SEL1 to SEL8 are supplied from a timing control circuit serving as an external circuit (not illustrated) to the control signal line 700 via the control signal terminal 104s of the external coupling terminals 104.

As illustrated in FIG. 3, the inspection circuit 130 includes a control circuit 132 and a TFT 134 that is a transistor provided per data line 6.

The control circuit 132 is configured to include a shift register. During inspection, an open/close signal TX, a transfer start pulse DX, a clock signal CLX, an inverted clock signal CLXB as well as a reference potential VSS and a power supply potential VDD as power sources are supplied as input signals to the control circuit 132. These signals are supplied from an inspection control circuit (not illustrated) disposed outside, through an input terminal 103i of the inspection terminals 103 (see FIG. 1) and through an inspection signal line 810 included in the coupling wiring 108 (see FIG. 1). During inspection, the control circuit 132 sequentially shifts the transfer start pulse DX in accordance with the clock signal CLX and the inverted clock signal CLXB to output transfer pulses X1, X2, . . . , X248 in correspondence with each group of the TFTs 134 described later. In the present exemplary embodiment, the input terminal 103i of the inspection terminals 103 is provided on the right side of the control circuit 132 in the X direction.

The TFTs 134 are each, for example, an n-channel type, and each source is electrically coupled to another end of the corresponding data line 6 (that is, another end opposite to one end to which the demultiplexer circuit 70 of the data line 6 is electrically coupled). The gates of the eight TFTs 134 corresponding to the data lines 6 belonging to the same group are electrically coupled in common, and a transfer pulse Xm corresponding to the group is supplied from the control circuit 132.

That is, the control circuit 132 supplies the transfer pulse Xm in common to the gates of the TFTs 134 corresponding to the (8m−7)th, (8m−6)th, (8m−5)th, (8m−4)th, (8m−3)th, (8m−2)th, (8m−1)th, and (8m)th data lines 6 constituting the m-th group.

In the 1st to 248th groups of the data lines 6, the drains of the TFTs 134 corresponding to the a-series data line 6 are electrically coupled in common to an inspection signal line 820 that, among the eight inspection signal lines 820, the number of which is the same as the number of data lines 6 constituting the group, is read as an inspection signal CX1. Similarly, in each group, the drains of the TFTs 134 corresponding to the b-series, c-series, d-series, e-series, f-series, g-series, and h-series data lines 6 are electrically coupled in common to the inspection signal lines 820, which are read as inspection signals CX2, CX3, CX4, CX5, CX6, CX7, and CX8, of the eight inspection signal lines 820. The inspection signal line 820 is included in the coupling wiring 108 (see FIG. 1) and is electrically coupled to an output terminal 103o of the inspection terminals 103 (see FIG. 1). The configuration is such that the inspection signals CX1 to CX8 can be taken out from the eight output terminals 103o provided on the left side in the X direction. The number of the output terminals 103o and the inspection signal lines 820 is the same as the number of group columns of the data lines 6.

During inspection, according to the inspection circuit 130 described above, for example, the control circuit 132 outputs the transfer pulses X1, X2, . . . , X248 to each group of the data lines 6 so as to put the operation state of the TFTs 134 of the respective groups into an ON state. Accordingly, the electric potentials of the data lines 6 to which inspection image signals having a predetermined voltage have been supplied are outputted to the output terminal 103o via the eight inspection signal lines 820. Then, an external judgment means electrically coupled to the eight inspection signal lines 820 conducts an inspection to determine whether the demultiplexer circuit 70 and the data lines 6 are functionally in good or poor condition by making a judgment as to whether the electric potentials of the eight inspection signal lines 820 are at predetermined levels. Note that such an inspection is performed in a state in which various components of the element substrate 10 are formed on the mother substrate serving as a substrate for an electro-optical device described later. That is, the inspection can be performed efficiently because the inspection is performed before taking out the element substrate 10 from the mother substrate, that is, before taking out the liquid crystal panel 110.

An inspection terminal 103y of the inspection terminals 103 (see FIG. 1) is an output terminal for reading an inspection output signal output from the scanning line drive circuit 102 as an inspection signal YEP during inspection, and is electrically coupled to the scanning line drive circuit 102 (more specifically, the output line of the final stage of the shift register of the scanning line drive circuit 102) included in the coupling wiring 108 (see FIG. 1). During inspection, the scanning line drive circuit 102 can be inspected by probing the inspection terminal 103y. The inspection signal YEP includes, in correspondence with the scanning direction of the scanning signal, an inspection signal YEPR output from the output line of the final stage of the shift register of the scanning line drive circuit 102 on the right side (R), and an inspection signal YEPL output from the output line of the final stage of the shift register of the scanning line drive circuit 102 on the left side (L).

Here, the operation of the liquid crystal device 100 configured as described above will now be described with reference to FIG. 3.

The scanning line drive circuit 102 sets the level of the scanning signals G1, G2, . . . , G1088 at a H level (that is, selected voltage) in a sequential and exclusive manner at the lapse of every one horizontal time period during a certain frame (n-th frame).

Here, in one horizontal time period, the control signals SEL1, SEL2, SEL8 supplied from the timing control circuit are exclusively set at the H level in this order, and in conjunction with this supply, the image signal supply circuit 400 supplies image signals VID1, VID2, VID3, . . . , VID248.

Specifically, during a time period in which the signal level of the scanning signal Gi of the i-th row is set at the H level, the image signal supply circuit 400 outputs image signals VID1, VID2, VID3, . . . , and VID248, which are either higher or lower than a common electric potential LCCOM by the level of a voltage according the gradation of the pixel P corresponding to the intersection of the i-th scanning line 3 and the a-series data line 6, in corresponds to the 1st, 2nd, 3rd, . . . , 248th groups at the same time. At this time, since only the control signal SEL1 is set at the H level, the a-series data lines 6 are selected (that is, only the transistor 71 corresponding to the a-series data lines 6 turns ON) and, as a result, the image signals VID1, VID2, VID3, . . . , and VID248 are supplied to the a-series (1st, 9th, 17th, . . . , 1977th) data lines 6, respectively. On the other hand, when the scanning signal Gi is at the H level, each of the pixel-switching TFTs 30 in all of the pixels P positioned in the i-th row turns ON (becomes conductive), thus the image signals VID1, VID2, VID3, . . . , and VID248 supplied to the a-series data lines 6 are applied to the 1st, 9th, 17th, . . . , and 1977th pixel electrodes 15 in the i-th row, respectively.

Next, when the control signal SEL2 is set at the H level, the image signal supply circuit 400 outputs image signals VID1, VID2, VID3, . . . , and VID248 of a voltage according to the gradation of the pixel P corresponding to the intersection of the i-th scanning line 3 and the b-series data lines 6, in correspondence to the 1st, 2nd, 3rd, . . . , 248th groups at the same time. At this time, since only the control signal SEL2 is set at the H level, the b-series data lines 6 are selected. As a result, the image signals VID1, VID2, VID3, . . . , and VID248 are supplied to the b-series (2nd, 10th, 18th, . . . , 1978th) data lines 6, respectively, and applied to the 2nd, 10th, 18th, . . . , and 1978th pixel electrodes 15 in the i-th row, respectively.

Similarly, during a time period in which the signal level of the scanning signal Gi of the i-th row is set at the H level, the image signal supply circuit 400 outputs image signals VID1, VID2, VID3, . . . , and VID248 according to the gradation of the pixel P corresponding to the intersection of the i-th scanning line 3 and the c-series data lines 6, in correspondence to the 1st, 2nd, 3rd, . . . , 248th groups at the same time. Similarly, when the control signal SEL4, SEL5, SEL6, SEL7, and SEL8 are each at the H level, the image signal supply circuit 400 outputs image signals VID1, VID2, VID3, . . . , and VID248 according to the gradation of the pixel P corresponding to the intersection of the i-th scanning line 3 and the d-series data lines 6, according to the gradation of the pixel P corresponding to the intersection of the i-th scanning line 3 and the e-series data lines 6, according to the gradation of the pixel P corresponding to the intersection of the i-th scanning line 3 and the f-column data lines 6, according to the gradation of the pixel P corresponding to the intersection of the i-th scanning line 3 and the g-series data lines 6, and according to the gradation of the pixel P corresponding to the intersection of the i-th scanning line 3 and the h-series data lines 6, respectively, in correspondence to the 1st, 2nd, 3rd, . . . , 248th groups at the same time. Thus, the image signals VID1, VID2, VID3, . . . , and VID248 according to the gradation of the pixels P of the i-th row are supplied to the c-series (3rd, 11th, 19th, . . . , 1979th) data lines 6, and applied to the 3rd, 11th, 19th, . . . , and 1979th pixel electrodes 15 in the i-th row, respectively. Similarly, in continuation, the image signals are supplied to the d-column (4th, 12th, 20th, . . . , 1980th) data lines 6, and applied to the 4th, 12th, 20th, . . . , and 1980th pixel electrodes 15 in the i-th row, respectively. In continuation, the image signals are supplied to the e-series (5th, 13th, 21st, . . . , 1981st) data lines 6, and applied to the 5th, 13th, 21st, . . . , and 1981st pixel electrodes 15 in the i-th row, respectively. In continuation, the image signals are supplied to the f-series (6th, 14th, 22nd, . . . , 1982nd) data lines 6, and applied to the 6th, 14th, 22nd, . . . , and 1982nd pixel electrodes 15 in the i-th row, respectively. In continuation, the image signals are supplied to the g-series (7th, 15th, 23rd, . . . , 1983rd) data lines 6, and applied to the 7th, 15th, 23rd, . . . , and 1983rd pixel electrodes 15 in the i-th row, respectively. In continuation, the image signals are supplied to the h-series (8th, 16th, 24th, . . . , 1984th) data lines 6, and applied to the 8th, 16th, 24th, . . . , and 1984th pixel electrodes 15 in the i-th row, respectively.

As a result, the operation of writing the voltage of the image signal according to the gradation is completed for the pixels P in the i-th row. Note that the voltage applied to the pixel electrode 15 is held by the liquid crystal capacitors until the writing of the next (n+1) frame, even when the scanning signal Gi turns to the L level.

Note that, the plurality of external coupling terminals 104 include not only the image signal terminal 104v into which the image signals VID1, VID2, and VID3, . . . , VID248 are input from the image signal supply circuit 400 and the control signal terminals 104s into which the control signals SEL1 to SEL8 are input, but also a terminal into which the common electrode potential LCCOM supplied to the common electrode 23 of the counter substrate 20 is input, a terminal into which the reference potential VSS is input, a terminal into which the power supply potential VDD is input, a terminal into which the transfer direction control signal DIRY is input, and the like. Other input signals other than the common electrode potential LCCOM are supplied to the scanning line drive circuit 102 via a coupling wiring coupled to each terminal.

Substrate for Electro-Optical Device

Figure 5:
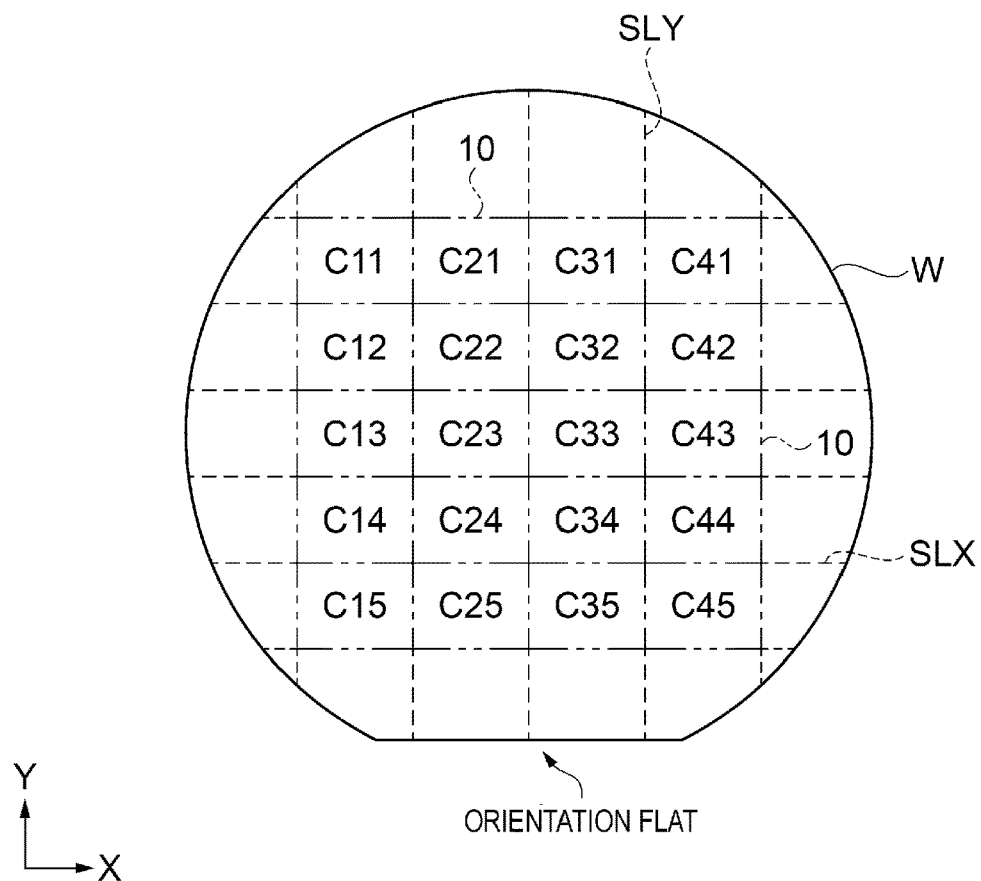
FIG. 5 is a schematic plan view illustrating a mother substrate as a substrate for an electro-optical device.

Next, a substrate for an electro-optical device used in the manufacture of the liquid crystal panel 110 will be described with reference to FIG. 5. FIG. 5 is a schematic plan view illustrating a mother substrate as a substrate for an electro-optical device.

As illustrated in FIG. 5, a mother substrate W serving as the substrate for an electro-optical device is, for example, obtained using a transparent quartz substrate as a base material, and is formed into a wafer. The element substrate 10 of the liquid crystal panel 110 is manufactured using the mother substrate W. The element substrate 10 has a plurality of surfaces (design layout) in the X direction and the Y direction on the mother substrate W based on an orientation flat in which a portion of the mother substrate W having a wafer shape is cut out. Specifically, after each component of the element substrate 10 is formed using the mother substrate W, for each individual element substrate 10, the counter substrate 20 is disposed opposite to the element substrate 10, a region surrounded by the seal portion 40 between the element substrate 10 and the counter substrate 20 is filled with liquid crystal, and the element substrate 10 and the counter substrate 20 are bonded together. Thereafter, the mother substrate W is cut and the individual liquid crystal panels 110 are taken out.

The element substrate 10 laid out on the mother substrate W is an example of an individual substrate in the present disclosure. In the present exemplary embodiment, the element substrate 10, which is an individual substrate, is referred to as a chip. A chip number is given in accordance with a planar position of the chip in the mother substrate W. For example, as illustrated in FIG. 5, the chip number "C11" is given based on the element substrate 10 positioned at the top left in the drawing. The element substrate 10 adjacent to the chip C11 in the Y direction is chip number "C12" and is referred to as a chip C12. The element substrate 10 adjacent to the chip C11 in the X direction is chip number "C21" and is referred to as a chip C21. The element substrate 10 adjacent to the chip C21 in the Y direction is chip number "C22" and is referred to as a chip C22. That is, the element substrates 10 (chips) arranged in a matrix in the X direction and the Y direction are given chip numbers according to the column number in the X direction and the row number in the Y direction.

Inspection of the plurality of element substrates 10 (chips) mounted on the mother substrate W can be performed for each chip using the inspection terminals 103 provided in the third peripheral region E3 of the element substrate 10, as described above. Note that, with a plurality of chips set as one inspection unit, inspecting may be performed for each inspection unit.

Between the plurality of chips, there is a virtual scribe line SLX extending in the X direction and a virtual scribe line SLY extending in the Y direction. The individual element substrates 10 are taken out from the mother substrate W by cutting the mother substrate W along the scribe lines SLX, SLY. That is, the scribe lines SLX, SLY are dividing lines on the design so that the liquid crystal panels 110 can be taken out after assembly. The scribe lines SLX, SLY are virtual lines not disposed on the mother substrate W, and marks (not illustrated) capable of specifying the positions of the scribe lines SLX, SLY are actually formed on the mother substrate W in correspondence with the individual element substrates 10. Note that, examples of the method of cutting the mother substrate W includes dicing, brace-reinforced scribing, laser scribing, and the like. In the present exemplary embodiment, a common wiring described later is taken out during cutting, and thus the dicing method is used.

Common Wiring

Figure 6:
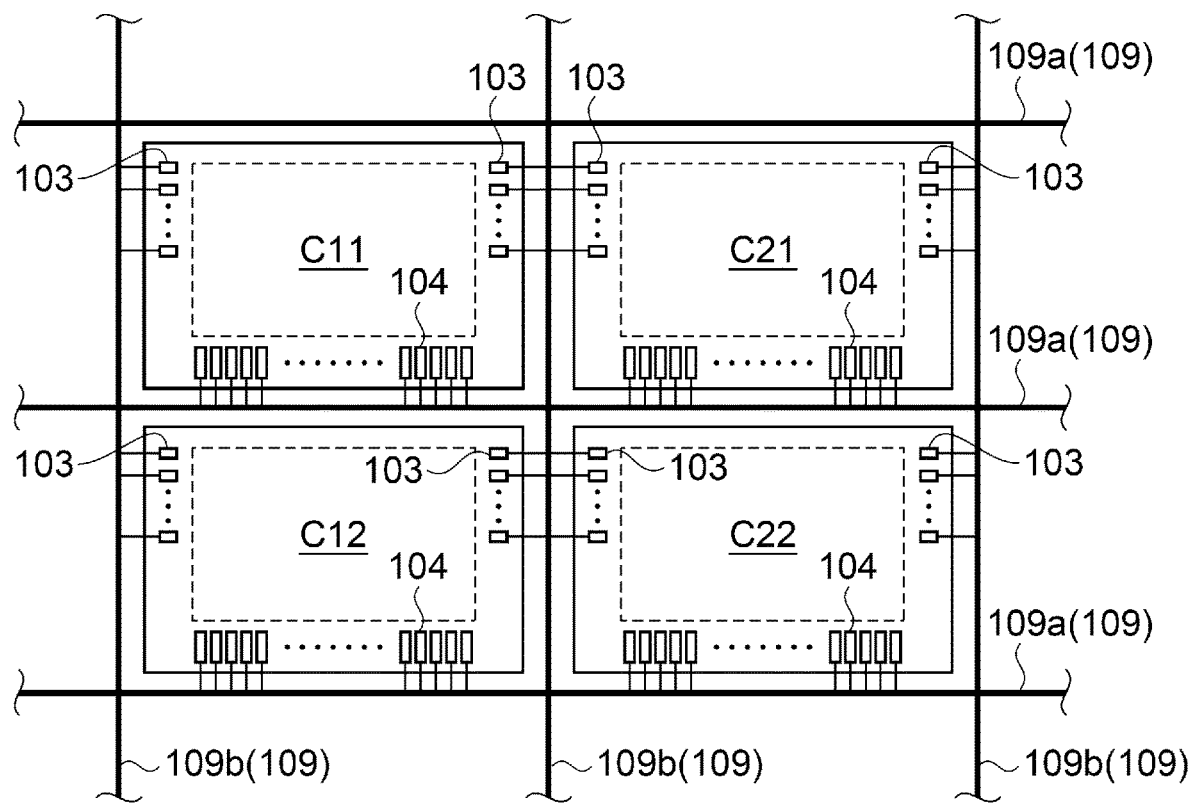
FIG. 6 is a schematic plan view illustrating an electrical arrangement of a common wiring in the mother substrate.

Next, a common wiring to which the plurality of inspection terminals 103 and the plurality of external connection terminals 104 are coupled, will be described with reference to FIG. 6. FIG. 6 is a schematic plan view illustrating an electrical arrangement of the common wiring in the mother substrate. In the present exemplary embodiment, an example of the common wiring of the present disclosure is referred to as a guard line.

As illustrated in FIG. 6, a guard line 109 as a common wiring is arranged in the mother substrate W so as to surround each of the four element substrates 10, which are the chips C11, C12, C21, and C22, arranged in the X direction and the Y direction. The guard line 109 is arranged in the mother substrate W in a so-called lattice-like manner. The guard line 109 includes guard lines 109a extending in the X direction between the corresponding chips, and guard lines 109b extending in the Y direction between the corresponding chips similarly. The guard line 109a, which faces the plurality of external connection terminals 104 and extends in the X direction, and each of the plurality of external connection terminals 104 are electrically coupled. In addition, the guard line 109b extending in the Y direction between the corresponding chips, and each of the plurality of inspection terminals 103 are electrically coupled. The guard line 109a extending in the X direction is an example of a first common wiring or a third common wiring of the present disclosure. The guard line 109b extending in the Y direction is an example of a second common wiring of the present disclosure. The guard line 109a and the guard line 109b are electrically coupled to each other.

The guard line 109 is arranged in order to prevent the connection wiring or the transistors coupled to the inspection terminal 103 and the external connection terminal 104 from being damaged or broken due to static electricity. Even when the static electricity enter the inspection terminal 103 and the external connection terminal 104, the static electricity then dissipate to the guard line 109. The guard line 109 is arranged on the mother substrate W illustrated in FIG. 5 so as to basically overlap with the scribe lines SLX and SLY in a plan view. In addition, the plurality of inspection terminals 103 of the chips adjacent to each other in the X direction are arranged so as to sandwich the guard line 109b extending in the Y direction. That is, when the mother substrate W is cut along the scribe lines SLX and SLY, the guard line 109 is cut (diced), and the guard line 109a and the external connection terminals 104 are separated from each other. Similarly, the guard line 109b and the inspection terminal 103 are separated from each other.

Note that, FIG. 6 does not accurately illustrate the number of the input terminal 103i and the output terminal 103o in the inspection terminal 103 and the number of the external connection terminal 104. The inspection terminal 103y to which an inspection signal YEP is output from the scanning line drive circuit 102, is included in the output terminal 103o of the inspection terminal 103 (see FIG. 3).

Figure 7:
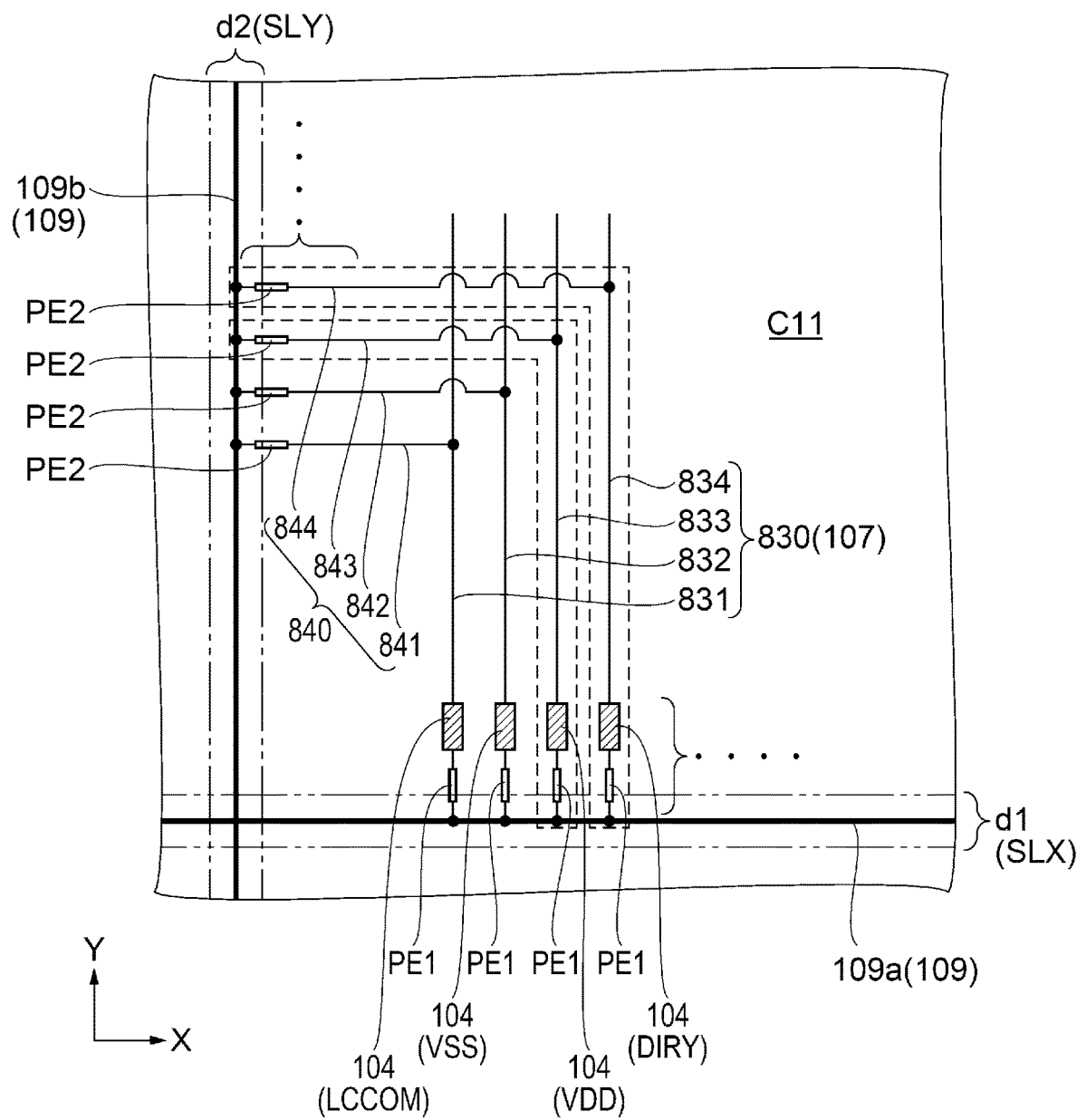
FIG. 7 is a circuit diagram illustrating an electrical coupling between an external coupling terminal and a guard line.
Figure 8:
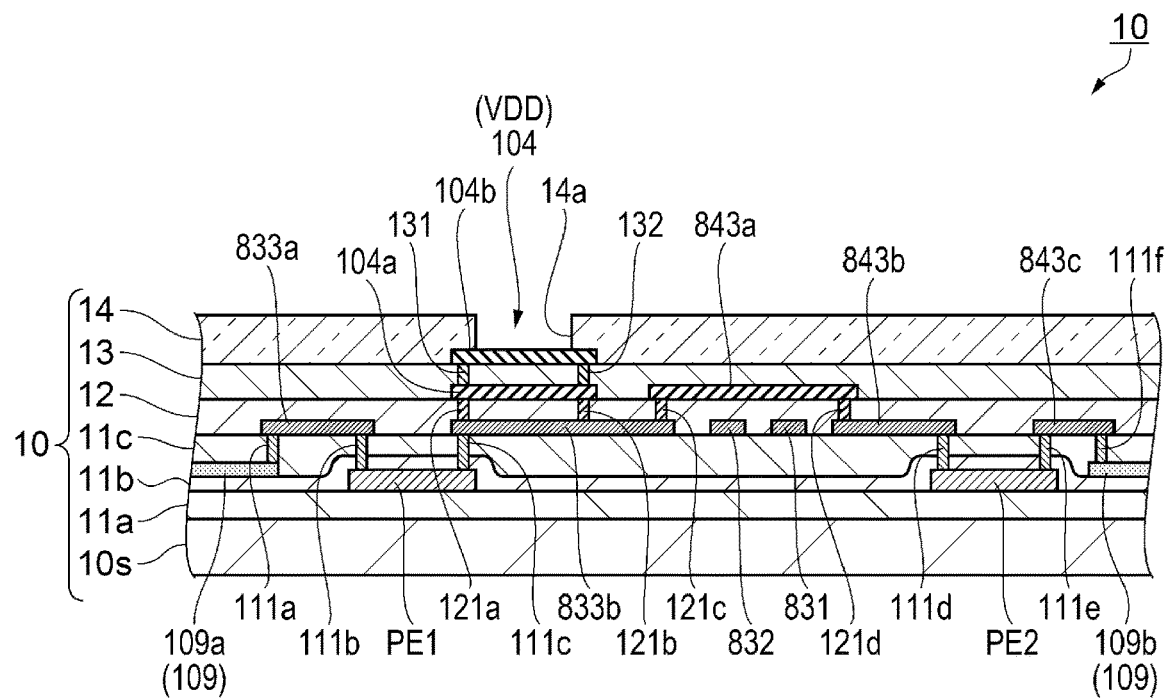
FIG. 8 is a schematic cross-sectional view illustrating an electrical coupling structure between the external coupling terminal and the guard line pertaining to a power supply potential VDD.
Figure 9:
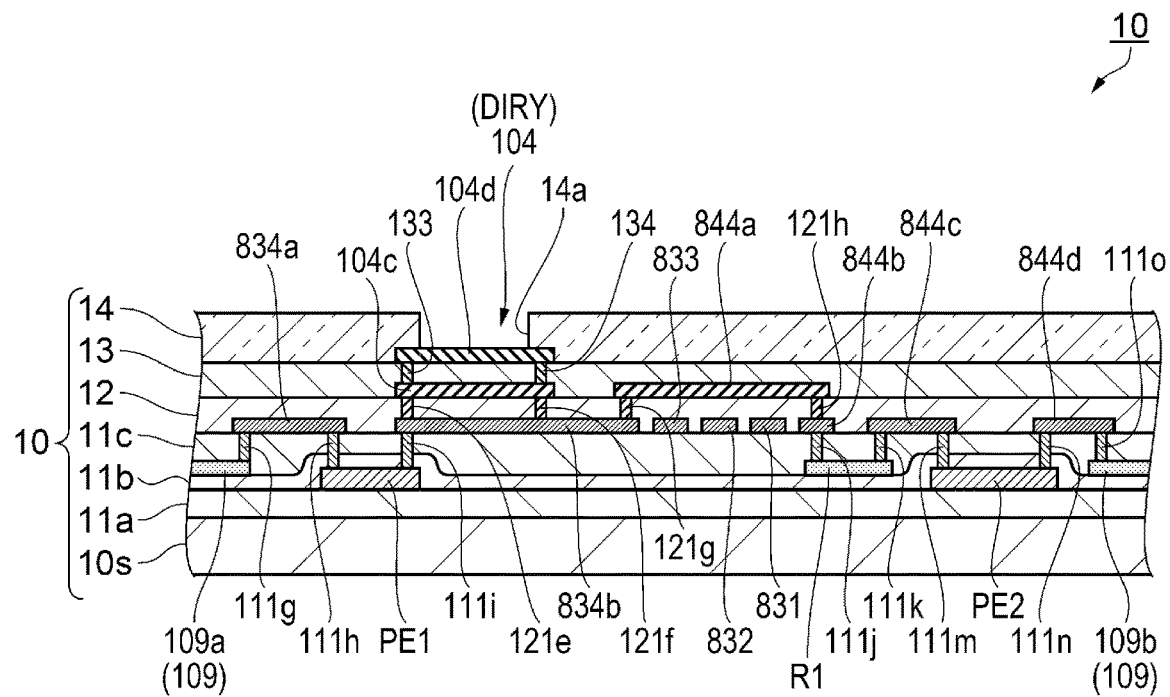
FIG. 9 is a schematic cross-sectional view illustrating an electrical coupling structure between the external coupling terminal and the guard line pertaining to a transfer direction control signal DIRY.

Electrical Coupling Between Common Wiring and Each of Connection Terminal and Connection Wiring Next, the electrical coupling between the plurality of external connection terminals 104 as the first connection terminal and the guard line 109 as the common wiring will be described in detail with reference to FIGS. 7 to 9. FIG. 7 is a circuit diagram illustrating an electrical coupling between the external connection terminal and the guard line. FIG. 8 is a schematic cross-sectional view illustrating an electrical coupling structure between the external connection terminals for the power potential VDD and the guard line. FIG. 9 is a schematic cross-sectional view illustrating an electrical coupling structure between the external connection terminals and the guard line for the transfer direction control signal DIRY. Note that, FIG. 7 illustrates an electrical coupling between the guard line 109 and some of the plurality of external connection terminals 104 in the chip C11 of the mother substrate W.

As illustrated in FIG. 7, in the chip C11 (the element substrate 10), the plurality of external connection terminals 104 are spaced apart from each other in the X direction along a first side of the chip C11. The common electrode potential LCCOM, the reference potential VSS, the power potential VDD, and the transfer direction control signal DIRY in order from the left side in FIG. 7 are input to the four external connection terminals 104 arrayed in the left end side in the X direction among the plurality of external connection terminals 104.

A connection wiring 830 is coupled to each of the plurality of external connection terminals 104. The connection wiring 830 is included in the connection wiring 107 illustrated in FIG. 1. Specifically, the connection wiring 830 includes a connection wiring 831 coupled to the external connection terminal 104 (LCCOM), a connection wiring 832 coupled to the external connection terminal 104 (VSS), a connection wiring 833 coupled to the external connection terminal 104 (VDD), and a connection wiring 834 coupled to the external connection terminal 104 (DIRY). Each of these connection wiring lines 831, 832, 833, and 834 is an example of a first connection wiring of the present disclosure.

Each of the plurality of external connection terminals 104 arrayed in the first side is coupled to the guard line 109a as the first common wiring through a first electrostatic protection circuit PE1.

The connection wiring 831 is coupled to the vertical conductive portion 106, as illustrated in FIG. 1. The connection wiring lines 832, 833, and 834 are coupled to the scanning line drive circuit 102 as an internal circuit.

The vertical conductive portion 106 side of the connection wiring 831 is coupled to the guard line 109b as a second common wiring extending in the Y direction through a connection wiring 841 and a second electrostatic protection circuit PE2. The scanning line drive circuit 102 side of the connection wiring 832 is coupled to the guard line 109b extending in the Y direction through a connection wiring 842 and the second electrostatic protection circuit PE2. Similarly, the scanning line drive circuit 102 side of the connection wiring 833 is coupled to the guard line 109b extending in the Y direction through a connection wiring 843 and the second electrostatic protection circuit PE2. The scanning line drive circuit 102 side of the connection wiring 834 is coupled to the guard line 109b extending in the Y direction through a connection wiring 844 and the second electrostatic protection circuit PE2. These connection wiring lines 841, 842, 843, and 844 are collectively referred to as a connection wiring 840.

That is, the external connection terminal 104, serving as the first connection terminal, has the tip of one end electrically coupled to the guard line 109a as the first common wiring extending along the first side through the first electrostatic protection circuit PE1, and has the tip of the other end of the external connection terminal 104 electrically coupled to the scanning line drive circuit 102 as the internal circuit through the connection wiring 830 as the first connection wiring. The scanning line drive circuit 102 side of the connection wiring 830 is electrically coupled to the guard line 109b as the second common wiring extending along a second side intersecting the first side through the connection wiring 840 and the second electrostatic protection circuit PE2.

FIG. 7 does not illustrate an electrical coupling between all of the plurality of external connection terminals 104 and the guard line 109b. However, nearly half the plurality of external connection terminals 104 arrayed in the first side are electrically coupled to the guard line 109b extending along the second side of the left side. The remaining external connection terminals 104 are electrically coupled to the guard line 109b extending along the second side of the right side.

The guard line 109a extends in the X direction along the virtual scribe line SLX as described above. The guard line 109b also extends in the Y direction along the virtual scribe line SLY as described above. FIG. 7 illustrates, with a two-dot chain line, a dicing width d1 in the Y direction and a dicing width d2 in the X direction when employing a dicing process for a method of scribing (cutting) the mother substrate W along the scribe lines SLX and SLY. The dicing width of d1 and d2 is 100 μm, for example. The width of the guard lines 109a and 109b is greater than or equal to 10 μm and is less than that of the dicing width of d1 and d2, for example, 30 μm, taking account of electrostatic dissipation. By performing dicing on the mother substrate W, the guard lines 109a and 109b are removed and the first electrostatic protection circuit PE1 and the second electrostatic protection circuit PE2 are partially removed. This causes the plurality of external connection terminals 104 to be separated from the guard line 109a. The connection wiring 840 is also separated from the guard line 109b.

In addition, the first electrostatic protection circuit PE1 is partially exposed on an end surface in the first side of the chip C11 (the element substrate 10) which is taken out by scribing (cutting) the mother substrate W. The second electrostatic protection circuit PE2 is partially exposed on an end surface in the second side of the chip C11 (the element substrate 10). In other words, the first electrostatic protection circuit PE1 which is cut, remains in the first side of the element substrate 10, and the second electrostatic protection circuit PE2 which is cut, remains in the second side.

Next, referring to FIG. 8, the following is a description of an electrical coupling structure between the guard lines 109a and 109b and the external connection terminal 104 to which the power potential VDD is input. Note that, in FIG. 7, a portion showing the corresponding connection structure is enclosed with a dashed line.

As illustrated in FIG. 8, a first insulation film 11a is firstly formed on the base substrate 10s. The first insulation film 11a is formed by using, for example, a silicon oxide film (None-doped Silicate Glass; NSG film) or a silicon nitride film (SixNy film), which is not intentionally doped with impurities. Examples of a method of forming the first insulation film 11a can include atmospheric pressure CVD, low pressure CVD, or plasma CVD, using a processing gas such as monosilane ($SiH_4$), dichlorosilane ($SiCl_2H_2$), tetraethoxysilane (TEOS), or ammonia. The first insulation film 11a has a thickness of, for example, 200 nm.

Note that, in the display region E0, semiconductor layers for the TFTs 30 of the pixel circuits are formed on the first insulation film 11a. In addition, in the first peripheral region E1, semiconductor layers for transistors in the peripheral circuits are formed on the first insulation film 11a.

In the present exemplary embodiment, the material same as the material constituting the above-mentioned semiconductor layers is used in the third peripheral region E3 to form the first electrostatic protection circuits PE1 and the second electrostatic protection circuits PE2, respectively, on the first insulation film 11a. Specifically, a polysilicon film which is made conductive by implanting impurity ions is patterned to form resistive elements, which function as the first electrostatic protection circuits PE1 and the second electrostatic protection circuits PE2. The conductive polysilicon film is formed by, for example, depositing a polysilicon film doped with phosphorus (P) by low pressure CVD and subsequently performing a phosphorus diffusion treatment. The conductive polysilicon film has a thickness of, for example, 50 nm to 100 nm. Note that, the atom with which the polysilicon film is doped is not limited to phosphorus (P).

The planar shape of the resistive elements formed in this manner may be line-shaped, or may have a shape in which a line-shaped portion includes a meandering portion to adjust the resistance value. The resistive elements constituting the first electrostatic protection circuits PE1 and the second electrostatic protection circuits PE2 are scribed, and portions of the resistive elements remain on a side of the element substrate 10, as previously described. Even when static electricity generated during scribing enter the remaining portions of the first electrostatic protection circuits PE1 and the second electrostatic protection circuits PE2, the static electricity may be consumed by the remaining portions of the resistive elements, and the resistive elements may have a resistance value greater than the resistance value of the connection wiring 830 or the connection wiring 840 (in other words, the line width is smaller and the film thickness is smaller). The resistance value of the connection wiring 830 and the connection wiring 840 is, for example, less than or equal to 1 kΩ, and the resistance value of the resistive elements constituting the first electrostatic protection circuits PE1 and the second electrostatic protection circuits PE2 is, for example, from several hundred kΩ to 1 MΩ (megohm).

Next, a gate insulation film 11b is formed to cover the first electrostatic protection circuits PE1 and the second electrostatic protection circuits PE2. The gate insulation film 11b has, for example, a two-layer structure including a first silicon oxide film obtained by thermally oxidizing a semiconductor film of silicon and a second silicon oxide film formed by low pressure CVD under a high-temperature condition of from 700° C. to 900° C. The gate insulation film 11b has a thickness of, for example, 75 nm.

Next, the guard lines 109a and 109b (109) are then formed on the gate insulation film 11b. The guard lines 109 are made of the same material as the gate electrodes of the TFTs 30 and the transistors of the peripheral circuits described above, and formed of, for example, a conductive polysilicon film, which is the same as the resistive elements constituting the first electrostatic protection circuits PE1 and the second electrostatic protection circuits PE2. In this case, the conductive polysilicon film has a thickness of, for example, 150 nm. In the mother substrate W, each one of the guard lines 109 extending in the X direction or the Y direction has a resistance value of, for example, approximately 100Ω.

Next, a second insulation film 11c is formed, which covers the guard lines 109. The second insulation film 11c is formed by using a silicon-based oxide film such as the above-described NSG film, or a Phospho Silicate Glass (PSG) film containing phosphorus (P), a Boro Silicate Glass (BSG) film containing boron, or a Boro-Phospho Silicate Glass (BPSG) film containing boron (B) and phosphorus (P). Examples of a method of forming these silicon-based oxide films can include an atmospheric pressure CVD, low pressure CVD, or plasma CVD using, for example, monosilane, dichlorosilane, TEOS, triethylborane (TEB), or trimethyl phosphate (TMPO). The second insulation film 11c has a thickness of, for example, 300 nm.

Next, a plurality of through holes are formed, which pass through the second insulation film 11c to reach the guard lines 109a and 109b, and a plurality of through holes are formed, which pass through the second insulation film 11c and the gate insulation film 11b to reach the first electrostatic protection circuits PE1 and the second electrostatic protection circuits PE2. Then, a conductive film is formed and patterned so as to cover at least inner walls of these through holes, and to thereby form wiring lines 833a and 833b, which constitute the connection wiring lines 831 and 832, and the connection wiring 833. In addition, wiring lines 843b and 843c, which constitute the connection wiring 843, are formed.

Furthermore, the above-mentioned conductive film is patterned to form a contact hole 111a causing the guard line 109a to be coupled to the wiring 833a, a contact hole 111b causing the wiring 833a to be coupled to the first electrostatic protection circuit PE1, and a contact hole 111c causing the first electrostatic protection circuit PE1 to be coupled to the wiring 833b. Additionally, a contact hole 111d causing the wiring 843b to be coupled to the second electrostatic protection circuit PE2, a contact hole 111e causing the second electrostatic protection circuit PE2 to be coupled to the wiring 843c, and a contact hole 111f causing the wiring 843c to be coupled to the guard line 109b, are formed.

Examples of such a conductive film include a multi-layer structure including a layer made of, for example, Al (aluminum), Ti (titanium), or TiN (titanium nitride), which is a low-resistance metal. Such a conductive film has a thickness of, for example, 500 nm.

Next, a third insulation film 12 is formed, which covers the wiring lines 831, 832, 833a, 833b, 843b, and 843c. The third insulation film 12 is also formed by using a silicon-based oxide film such as the above-mentioned NSG film, or a PSG film containing phosphorus (P), a BSG film containing boron, or a BPSG film containing boron (B) and phosphorus (P). The third insulation film 12 has a thickness of, for example, 300 nm.

Next, a plurality of through holes are formed, which pass through the third insulation film 12 to reach the wiring 833b or the wiring 843b. Then, a conductive film is formed and patterned so as to cover at least inner walls of these through holes, and to thereby form a first layer 104a, which constitutes the external connection terminals 104 coupled to the wiring 833b through two contact holes 121a and 121b. Furthermore, a wiring 843a is formed, which constitutes the connection wiring 843, which is coupled to the wiring 833b through a contact hole 121c and coupled to the wiring 843b through a contact hole 121d. Examples of such a conductive film also include a multi-layer structure including a layer made of, for example, Al (aluminum), Ti (titanium), or TiN (titanium nitride), which is a low-resistance metal. This conductive film has a thickness of, for example, 150 nm.

Next, a fourth insulation film 13 is formed, which covers the first layer 104a and the wiring 843a. The fourth insulation film 13 is also formed by using a silicon-based oxide film such as the above-mentioned NSG film, or a PSG film containing phosphorus (P), a BSG film containing boron, or a BPSG film containing boron (B) and phosphorus (P). The fourth insulation film 13 has a thickness of, for example, 300 nm.

Next, a plurality of through holes are formed, which pass through the fourth insulation film 13 to reach the first layer 104a. Then, a conductive film is formed and patterned so as to cover at least inner walls of these through holes to thereby form a second layer 104b, which constitutes the external connection terminals 104 coupled to the first layer 104a through two contact holes 131 and 132. Examples of such a conductive film also include a multi-layer structure including a layer made of, for example, Al (aluminum), Ti (titanium), or TiN (titanium nitride), which is a low-resistance metal. This conductive film has a thickness of, for example, 150 nm.

Next, a fifth insulation film 14 is formed, which covers the second layer 104b. The fifth insulation film 14 is also formed by using a silicon-based oxide film such as the above-mentioned NSG film, or a PSG film containing phosphorus (P), a BSG film containing boron, or a BPSG film containing boron (B) and phosphorus (P). The fifth insulation film 14 has a thickness of, for example, 300 nm. Then, an opening 14a is then formed, which passes through the fifth insulation film 14 to reach the second layer 104b. A portion of the second layer 104b exposed in the opening 14a serves as the external connection terminal 104 (VDD).

With such wiring structure, the first electrostatic protection circuits PE1 and the second electrostatic protection circuits PE2, the guard lines 109a and 109b, the connection wiring 833, and the external connection terminals 104 (the first layer 104a and the second layer 104b) are formed in different wiring layers on the base substrate 10s.

As described above, portions of the first electrostatic protection circuits PE1 and the second electrostatic protection circuits PE2 are removed by scribing (cutting), and the portion of the connection wiring corresponding the power potential VDD that remains in the element substrate 10 is made up of a wiring layer formed of a wiring material with a lower resistance compared to other wiring layers. This suppresses attenuation and variation in the power potential VDD upon input of the power potential VDD.

Next, referring to FIG. 9, the following is a description of an electrical coupling structure between the guard lines 109a and 109b and the external connection terminal 104 to which the transfer direction control signal DIRY is input. Note that, in FIG. 7, a portion showing the corresponding connection structure is enclosed with a dashed line. Further, the configurations that are the same as those of the wiring structure illustrated in FIG. 8 are denoted by the same reference numerals, and detailed descriptions thereof will be omitted.

As illustrated in FIG. 9, the first insulation film 11a is formed on the base substrate 10s of the element substrate 10. Next, the first electrostatic protection circuits PE1 and the second electrostatic protection circuits PE2 are formed on the first insulation film 11a by using a conductive polysilicon film. The gate insulation film 11b is formed so as to cover the first electrostatic protection circuits PE1 and the second electrostatic protection circuits PE2. The guard lines 109a and 109b and a resistive element R1 are formed by using a conductive polysilicon film on the gate insulation film 11b. The resistive element R1 is electrically coupled to a wiring 844b and a wiring 844c which will be described below. Note that, as described above, the first electrostatic protection circuit PE1 and the second electrostatic protection circuit PE2 formed as resistive elements have a film thickness of less than that of the guard lines 109a and 109b and the resistive element R1.

The configuration is provided, which is capable of more significantly suppressing electrostatic damage to the connection wiring 830 and internal circuits (the scanning line drive circuit 102 in this case) coupled to the connection wiring 830, the configuration being achieved by placing the resistive element R1 between the second electrostatic protection circuit PE2 and the connection wiring 830 coupled to the external connection terminal 104 to which the transfer direction control signal DIRY is input. The resistive element R1 has a resistance value of, for example, greater than or equal to 100Ω and less than or equal to several kΩ.

Next, the second insulation film 11c is formed so as to cover the guard lines 109a and 109b and the resistive element R1, and a plurality of through holes are formed in the second insulation film 11c, which reach the guard lines 109a and 109b and the resistive element R1, respectively. Furthermore, a plurality of through holes are formed, which pass through the second insulation film 11c and the gate insulation film 11b to reach the first electrostatic protection circuit PE1 and the second electrostatic protection circuit PE2. A conductive film is formed on the second insulation film 11c and patterned so as to cover at least the interiors of these through holes to thereby form the wiring lines 831, 832, and 833. In addition, a wiring 834a is formed, which is coupled to the guard line 109a through a contact hole 111g passing through the second insulation film 11c, and coupled to the first electrostatic protection circuit PE1 through a contact hole 111h passing through the second insulation film 11c and the gate insulation film 11b. Further, a wiring 834b is formed, which is coupled to the first electrostatic protection circuit PE1 through a contact hole 111i passing through the second insulation film 11c and the gate insulation film 11b. Further, a wiring 844b is formed, which is coupled to the resistive element R1 through a contact hole 111j passing through the second insulation film 11c. Further, a wiring 844c is formed, which is coupled to the resistive element R1 through a contact hole 111k passing through the second insulation film 11c and coupled to the second electrostatic protection circuit PE2 through a contact hole 111m passing through the second insulation film 11c and the gate insulation film 11b. In addition, a wiring 844d is formed, which is coupled to the second electrostatic protection circuit PE2 through a contact hole 111n passing through the second insulation film 11c and the gate insulation film 11b, and coupled to the guard line 109b through a contact hole 111o passing through the second insulation film 11c. Examples of such a conductive film also include a multi-layer structure including a layer made of, for example, Al (aluminum), Ti (titanium), or TiN (titanium nitride), which is a low-resistance metal.

Next, the third insulation film 12 is formed, which covers the wiring lines 831, 832, 833, 834a, 834b, 844b, 844c, and 844d. Then, a plurality of through holes are formed, which pass through the third insulation film 12 to reach the wiring 834b or the wiring 844b. A conductive film is formed and patterned so as to cover at least the interiors of these through holes and to thereby form a first layer 104c, which constitutes the external connection terminal 104 that is coupled to the wiring 834b through two contact holes 121e and 121f. Further, a wiring 844a is formed, which constitutes a connection wiring 844, which is coupled to the wiring 834b through a contact hole 121g and coupled to the wiring 844b through a contact hole 121h. Examples of such a conductive film also include a multi-layer structure including a layer made of, for example, Al (aluminum), Ti (titanium), or TiN (titanium nitride), which is a low-resistance metal.

Next, the fourth insulation film 13 is formed, which covers the first layer 104c and the wiring 844a. A plurality of through holes are then formed, which pass through the fourth insulation film 13 to reach the first layer 104c. A conductive film is formed and patterned so as to cover at least the interiors of these through holes and to thereby form a second layer 104d, which constitutes the external connection terminal 104 that is coupled to the first layer 104c through two contact holes C13c and C13d. Examples of such a conductive film also include a multi-layer structure including a layer made of, for example, Al (aluminum), Ti (titanium), or TiN (titanium nitride), which is a low-resistance metal.

Next, the fifth insulation film 14 is formed, which covers the second layer 104d. Then, the opening 14a is then formed, which passes through the fifth insulation film 14 to reach the second layer 104d. A portion of the second layer 104d exposed in the opening 14a serves as the external connection terminal 104 (DIRY).

The wiring structure causes each of the plurality of external connection terminals 104 to be coupled to the guard line 109a as the first common wiring extending in the X direction through the first electrostatic protection circuit PE1, and to be coupled to the guard line 109b as the second common wiring extending in the Y direction through the second electrostatic protection circuit PE2.

Figure 10:
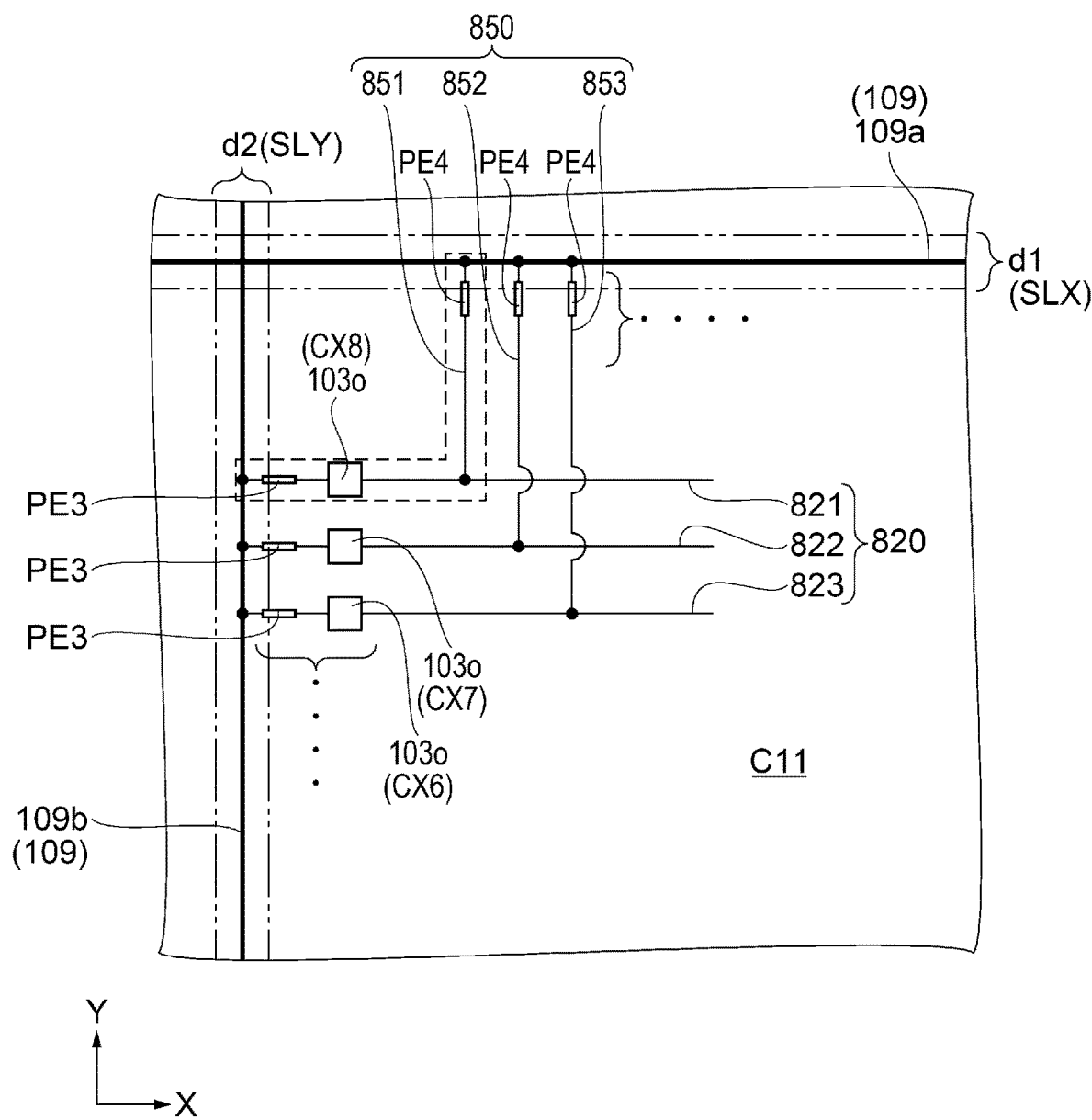
FIG. 10 is a circuit diagram illustrating an electrical coupling between an inspection terminal and the guard line.
Figure 11:
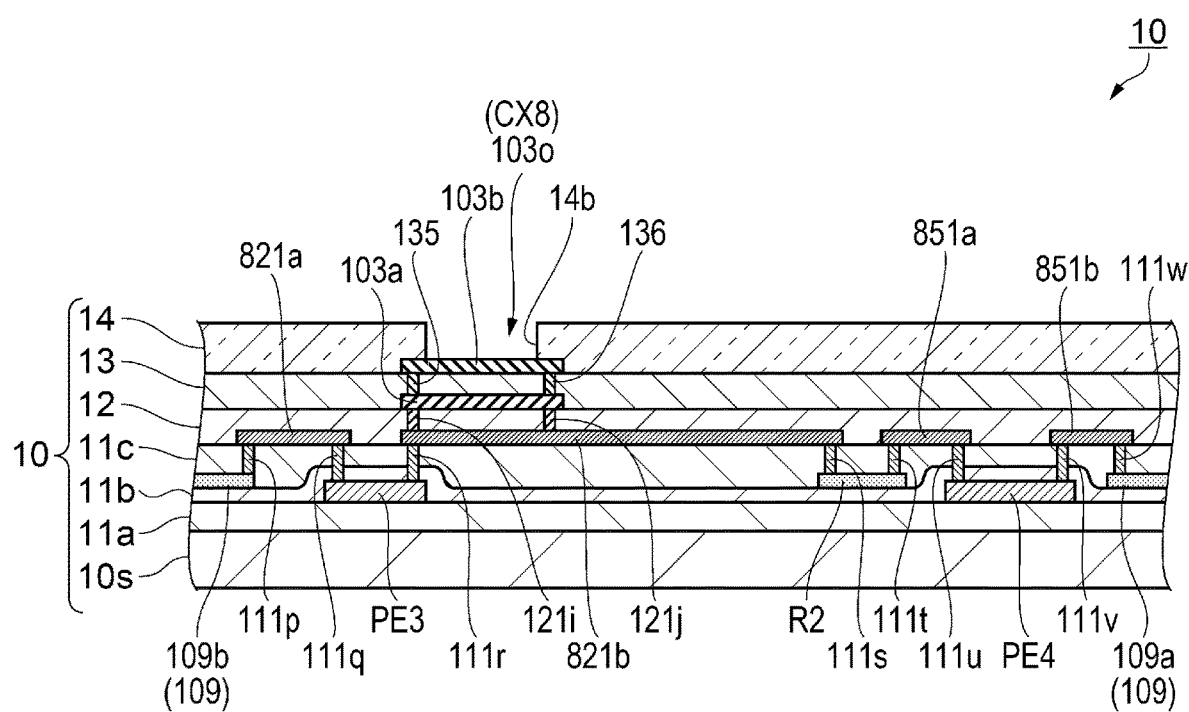
FIG. 11 is a schematic cross-sectional view illustrating an electrical coupling structure between the inspection terminal and the guard line.

Next, the electrical coupling between the plurality of inspection terminals 103 as the second connection terminals and the guard line 109 as the common wiring will be described in detail with reference to FIG. 10 and FIG. 11. FIG. 10 is a circuit diagram illustrating an electrical coupling between the inspection terminals and the guard line. FIG. 11 is a schematic cross-sectional view illustrating an electrical coupling structure between the inspection terminals and the guard line. Note that FIG. 10 illustrates an exemplary electrical coupling between the guard lines 109 and some of the output terminals 103o of the plurality of inspection terminals 103 in the chip C11 of the mother substrate W. Further, the configurations that are the same as those of the foregoing wiring structure corresponding to the coupling between the guard line 109 and the external connection terminals 104 are denoted by the same reference numerals, and detailed descriptions thereof will be omitted.

As illustrated in FIG. 10, in the chip C11 (the element substrate 10), the plurality of output terminals 103o of the plurality of inspection terminals 103 are spaced apart from each other in the Y direction along the second side of the chip C11 on the left side in the X direction. An output signal CX8, an output signal CX7, and an output signal CX6 are respectively output from, for example, three of the output terminals 103o arrayed in the Y direction among the plurality of output terminals 103o, one of these signals output from the uppermost one of the terminals being given first in this order.

An inspection signal line 820 is coupled to each of the plurality of output terminals 103o. The inspection signal line 820 is included in the connection wiring 108 illustrated in FIGS. 1 and 3. Hereinafter, the inspection signal line 820 is referred to as the connection wiring 820. Specifically, the connection wiring 820 includes a connection wiring 821 coupled to the output terminal 103o (CX8) at the upper end in the Y direction, a connection wiring 822 coupled to the output terminal 103o (CX7), and a connection wiring 823 coupled to the output terminal 103o (CX6). These connection wiring lines 821, 822, and 823 are examples of the second connection wiring of the present disclosure.

Each of the plurality of output terminals 103o arrayed in the second side is coupled to the guard line 109b as the second common wiring through the third electrostatic protection circuit PE3.

As illustrated in FIG. 3, the connection wiring lines 821, 822, and 823 are coupled to the TFTs 134 of the inspection circuit 130 as the internal circuit.

A side of the connection wiring 821 closer to the TFTs 134 is coupled to the guard line 109a extending in the X direction through the connection wiring 851 and the fourth electrostatic protection circuit PE4. Similarly, a side of the connection wiring 822 closer to the TFTs 134 is coupled to the guard line 109a extending in the X direction through the connection wiring 852 and the fourth electrostatic protection circuit PE4. A side of the connection wiring 823 closer to the TFTs 134 is coupled to the guard line 109a extending in the X direction through the connection wiring 853 and the fourth electrostatic protection circuit PE4. These connection wiring lines 851, 852, and 853 are collectively referred to as a connection wiring 850.

That is, the output terminal 103o (the inspection terminal 103), serving as the second connection terminal, has the tip of one end that is electrically coupled to the guard line 109b as the second common wiring extending along the second side through the third electrostatic protection circuit PE3. The tip of the other end of the output terminal 103o is electrically coupled to the TFTs 134 of the inspection circuit 130 as the internal circuit through the connection wiring 820 as the second connection wiring. The side of the connection wiring 820 closer to the TFTs 134 is electrically coupled to the guard line 109a as the third common wiring extending along the third side intersecting the second side through the connection wiring 850 and the fourth electrostatic protection circuit PE4.

Although all of the electrical couplings among the plurality of inspection terminals 103 and the guard lines 109 are not illustrated in FIG. 10, all of the inspection terminals 103 arrayed in the second side are electrically coupled to the guard line 109a extending in the X direction along the third side and to the guard line 109b extending in the Y direction along the second side. Further, the inspection terminal 103 includes not only the output terminals 103o but also the input terminals 103i and the inspection terminals 103y described above. These input terminals 103i and the inspection terminals 103y are also electrically coupled to the guard line 109a extending in the X direction and the guard line 109b extending in the Y direction.

The guard line 109a extends in the X direction along the virtual scribe line SLX as described above. The guard line 109b also extends in the Y direction along the virtual scribe line SLY as described above. As a method of scribing (cutting) the mother substrate W along the scribe lines SLX and SLY, when employing the dicing process, the dicing width d1 in the Y direction and the dicing width d2 in the X direction are, for example, 100 μm, and the width of the guard lines 109a and 109b is, for example, 30 μm, as described above. By performing dicing on the mother substrate W, the guard lines 109a and 109b are removed and the third electrostatic protection circuit PE3 and the fourth electrostatic protection circuit PE4 are partially removed. This causes the plurality of inspection terminals 103 to be separated from the guard line 109b. The connection wiring 850 is also separated from the guard line 109a.

In addition, the third electrostatic protection circuit PE3 is partially exposed on an end face in the second side of the chip C11 (the element substrate 10) which is taken out by scribing (cutting) the mother substrate W. The fourth electrostatic protection circuit PE4 is partially exposed on an end face of the third side of the chip C11 (the element substrate 10). In other words, the third electrostatic protection circuit PE3 that is cut, remains in the second side of the element substrate 10, and the fourth electrostatic protection circuit PE4 that is cut, remains in the third side.

Next, referring to FIG. 11, an electrical coupling structure will now be described, which is between the guard lines 109a and 109b and the output terminal 103o from which the output signal CX8 is output.

As illustrated in FIG. 11, the first insulation film 11a is formed on the base substrate 10s of the element substrate 10. Next, the third electrostatic protection circuit PE3 and the fourth electrostatic protection circuit PE4 are formed on the first insulation film 11a by using a conductive polysilicon film. The gate insulation film 11b is formed so as to cover the third electrostatic protection circuit PE3 and the fourth electrostatic protection circuit PE4, and the guard lines 109a and 109b and the resistive element R2 are formed by using a conductive polysilicon film on the gate insulation film 11b.

The resistive element R2 is electrically coupled to a wiring 821b and a wiring 851a that will be described below. Note that, the third electrostatic protection circuit PE3 and the fourth electrostatic protection circuit PE4, which are formed as the resistive elements, have a film thickness of less than the thickness of the guard lines 109a and 109b and the resistive element R2. The configuration is provided, which is capable of more significantly suppressing electrostatic damage to the connection wiring 820 and internal circuits (in this case, the TFTs 134 of the inspection circuit 130) coupled to the connection wiring 820, in a manner similar to the above-mentioned resistive element R1, the configuration being achieved by placing the resistive element R2 between the fourth electrostatic protection circuit PE4 and the connection wiring 820 coupled to the output terminal 103o from which the output signal CX8 is output. The third electrostatic protection circuit PE3 and the fourth electrostatic protection circuit PE4 have a resistance value of from hundreds of kΩ to 1 MΩ, which is similar to the first electrostatic protection circuit PE1 and the second electrostatic protection circuit PE2. In addition, the resistive element R2 has a resistance value of, for example, greater than or equal to 100Ω and less than or equal to several kΩ, which is similar to the resistive element R1.

Next, the second insulation film 11c is formed so as to cover the guard line 109a and 109b and the resistive element R2, and a plurality of through holes are formed in the second insulation film 11c to each of the guard line 109a and 109b and the resistive element R2. Furthermore, a plurality of through holes are formed, which pass through the second insulation film 11c and the gate insulation film 11b to reach the third electrostatic protection circuit PE3 and the fourth electrostatic protection circuit PE4. A conductive film is formed on the second insulation film 11c and patterned so as to cover at least the interiors of these through holes to thereby form wiring lines 821a, 821b, 851a, and 851b. In addition, the wiring 821a is coupled to the guard line 109b through a contact hole 111p passing through the second insulation film 11c, and coupled to the third electrostatic protection circuit PE3 through a contact hole 111q passing through the second insulation film 11c and the gate insulation film 11b. Further, the wiring 821b is coupled to the third electrostatic protection circuit PE3 through a contact hole 111r passing through the second insulation film 11c and the gate insulation film 11b, and is coupled to the resistive element R2 through a contact hole 111s passing through the second insulation film 11c. Further, the wiring 851a is coupled to the resistive element R2 through a contact hole 111t passing through the second insulation film 11c, and is coupled to the fourth electrostatic protection circuit PE4 through a contact hole 111u passing through the second insulation film 11c and the gate insulation film 11b. Further, the wiring 851b is coupled to the fourth electrostatic protection circuit PE4 through a contact hole 111v passing through the second insulation film 11c and the gate insulation film 11b, and is coupled to the guard line 109a through a contact hole 111w passing through the second insulation film 11c. Examples of such a conductive film also include a multi-layer structure including a layer made of, for example, Al (aluminum), Ti (titanium), or TiN (titanium nitride), which is a low-resistance metal.

Next, the third insulation film 12 is formed, which covers the wiring 821a, 821b, 851a, and 851b. Then, a plurality of through holes are formed, which pass through the third insulation film 12 to reach the wiring 821b. A conductive film is formed and patterned so as to cover at least the interiors of these through holes and to thereby form the first layer 103a, which constitutes the output terminal 103o that is coupled to the wiring 821b through two contact holes 121i and 121j. Examples of such a conductive film also include a multi-layer structure including a layer made of, for example, Al (aluminum), Ti (titanium), or TiN (titanium nitride), which is a low-resistance metal.

Next, the fourth insulation film 13 is formed, which covers the first layer 103a. Then, a plurality of through holes are then formed, which pass through the fourth insulation film 13 to reach the first layer 103a. A conductive film is formed and patterned so as to cover at least the interiors of these through holes and to thereby form a second layer 103b, which constitutes the output terminal 103o that is coupled to the first layer 103a through two contact holes 135 and 136. Examples of such a conductive film also include a multi-layer structure including a layer made of, for example, Al (aluminum), Ti (titanium), or TiN (titanium nitride), which is a low-resistance metal.

Next, the fifth insulation film 14 is formed, which covers the second layer 103b. Then, an opening 14b is then formed, which passes through the fifth insulation film 14 to reach the second layer 103b. A portion of the second layer 103b exposed in the opening 14b serves as the output terminal 103o (CX8).

The wiring structure causes each of the plurality of inspection terminals 103 to be coupled to the guard line 109b as the second common wiring, which extends in the Y direction through the third electrostatic protection circuit PE3, and to be coupled to the guard line 109a as the third common wiring, which extends in the X direction through the fourth electrostatic protection circuit PE4.

Method of Manufacturing Substrate for Electro-Optical Device

Next, a method of manufacturing the mother substrate W, as a method of manufacturing a substrate for an electro-optical device, according to the present exemplary embodiment will be described.

As described with reference to FIGS. 8, 9, and 11, the method of manufacturing the mother substrate W according to the present exemplary embodiment includes, in the mother substrate W, forming the first electrostatic protection circuit PE1, the second electrostatic protection circuit PE2, the third electrostatic protection circuit PE3, and the fourth electrostatic protection circuit PE4, forming the guard lines 109a and 109b and the resistive elements R1 and R2, forming the connection wiring lines 820, 830, 840, and 850, forming the external connection terminal 104 and the inspection terminal 103, and cutting the first electrostatic protection circuit PE1 and the fourth electrostatic protection circuit PE4 along the scribe line SLX and cutting the second electrostatic protection circuit PE2 and the third electrostatic protection circuit PE3 along the scribe line SLY. While forming the connection wiring lines 820, 830, 840, and 850, the plurality of contact holes are also formed which are provided for electrically coupling the guard line 109 to each of the connection wiring lines 820, 830, 840, and 850 through the electrostatic protection circuits described above. One of the scribe lines SLX and SLY is cut ahead, followed by the other being cut.

According to the mother substrate W and the manufacturing method of the same, serving as the substrate for the electro-optical device, and the element substrate 10, serving as the individual circuit board, in the liquid crystal apparatus 100 of the present exemplary embodiment, the following effects can be achieved.

(1) The first electrostatic protection circuit PE1 is provided between the external connection terminal 104 as the first connection terminal and the guard line 109a as the first common wiring. In addition, the second electrostatic protection circuit PE2 is provided between the connection wiring 830, serving as the first connection wiring for coupling the external connection terminals 104 to the scanning line drive circuit 102 as the internal circuit, and the guard line 109b as the second common wiring. Therefore, when taking out the element substrate 10 from the mother substrate W, static electricity can be dissipated to the guard line 109b through the connection wiring 830 and the second electrostatic protection circuit PE2, even when such static electricity are generated during the operation of cutting along the first side in order to separate the external connection terminal 104 from the guard line 109a. The order of cutting is not limited to cutting the first side ahead, and the second side may be cut ahead instead. The static electricity can be dissipated to the guard line 109a through the connection wiring 830, the external connection terminals 104, and the first electrostatic protection circuit PE1, even when the static electricity are generated during the operation of cutting along the second side in order to separate the connection wiring 830 from the guard line 109b. That is, the mother substrate W can be provided which is capable of preventing the internal circuit or the connection wiring 830 coupled thereto from being damaged due to static electricity even when static electricity are generated as a result of cutting of the mother substrate W.

(2) The element substrate 10 further includes the inspection terminal 103 as the second connection terminal arranged in the second side of the element substrate 10. The inspection terminal 103 has the tip of one end that is electrically coupled to the guard line 109b extending along the second side through the third electrostatic protection circuit PE3. The tip of the other end of the inspection terminal 103 is electrically coupled to the inspection circuit 130 as the internal circuit through the connection wiring 820 as the second connection wiring. The inspection circuit 130 side of the connection wiring 820 is electrically coupled to the guard line 109a as the third common wiring extending along the third side intersecting the second side through the fourth electrostatic protection circuit PE4. Therefore, when taking out the element substrate 10 from the mother substrate W, static electricity can be dissipated to the guard line 109a through the connection wiring 820 and the fourth electrostatic protection circuit PE4, even when such static electricity are generated during the operation of cutting along the second side in order to separate the inspection terminal 103 from the guard lines 109b. The order of cutting is not limited to cutting the second side ahead, and the third side may be cut ahead instead. The static electricity can be dissipated to the guard line 109b through the connection wiring 820, the inspection terminals 103, and the third electrostatic protection circuit PE3, even when the static electricity are generated during the operation of cutting along the third side in order to separate the connection wiring 820 from the guard line 109a.

(3) The first electrostatic protection circuit PE1, the second electrostatic protection circuit PE2, the third electrostatic protection circuit PE3, and the fourth electrostatic protection circuit PE4 are a resistive element. The resistive element has the resistance value greater than the resistance value of the connection wiring 820 or the connection wiring 830. Therefore, static electricity that enter into the external connection terminal 104 or the inspection terminal 103 can be consumed by the resistive element. That is, any of the first electrostatic protection circuit PE1, the second electrostatic protection circuit PE2, the third electrostatic protection circuit PE3, or the fourth electrostatic protection circuit PE4 can protect the internal circuit and the connection wiring coupled thereto against any electrostatic damage.

(4) The element substrate 10 includes, on the base substrate 10s, the internal circuit, the external connection terminal 104 arranged in the first side of the base substrate 10s, the connection wiring 830 that electrically couples the internal circuit to the external connection terminal 104, the first electrostatic protection circuit PE1 that is provided between the external connection terminal 104 and the first side and has the tip of one end electrically coupled to the external connection terminal 104 and the tip of the other end being cut at the first side, and the second electrostatic protection circuit PE2 that is arranged in the second side intersecting the first side and has the tip of one end electrically coupled to the internal circuit side of the connection wiring 830 and the tip of the other end being cut at the second side. With such configuration of the element substrate 10, the element substrate 10 can be provided which is capable of protecting the internal circuit against any electrostatic damage with the first electrostatic protection circuit PE1 or the second electrostatic protection circuit PE2, even when the static electricity are generated during the operation of cutting along one of the first side and the second side to manufacture the element substrate 10.

(5) The liquid crystal apparatus 100 as the electro-optical device includes the element substrate 10 taken out from the mother substrate W, the counter substrate 20, and the liquid crystal layer 50 as the electro-optical element disposed between the element substrate 10 and the counter substrate 20. Therefore, since the element substrate 10 is employed in which the internal circuit is protected against any electrostatic damage in the manufacturing process, a liquid crystal apparatus 100 can be provided in which electrical failure in the internal circuit of the element substrate 10 can be reduced and stable operation can be achieved.

(6) In the manufacturing method of the mother substrate W, the element substrate 10 includes the internal circuit and the plurality of external connection terminals 104 arranged in the first side. Each of the plurality of external connection terminals 104 has the tip of one end that is electrically coupled to the guard line 109a extending in the X direction along the first side through the first electrostatic protection circuit PE1. The tip of the other end of external connection terminal 104 is electrically coupled to the internal circuit through the connection wiring 830. The internal circuit side of the connection wiring 830 is electrically coupled to the guard line 109b extending in the Y direction along the second side intersecting the first side through the second electrostatic protection circuit PE2. While the first electrostatic protection circuit PE1 is cut in the X direction, the second electrostatic protection circuit PE2 is cut in the Y direction such that the element substrate 10 is taken out. Therefore, when taking out the element substrate 10 from the mother substrate W, static electricity can be dissipated to the guard line 109b through the connection wiring 830 and the second electrostatic protection circuit PE2, even when such static electricity are generated when the first electrostatic protection circuit PE1 is cut in the X direction. The order of the cuts is not limited to cutting the first electrostatic protection circuit PE1 ahead, and the second electrostatic protection circuit PE2 may be cut ahead instead. The static electricity can be dissipated to the guard line 109a through the connection wiring 830, the external connection terminals 104, and the first electrostatic protection circuit PE1, even when the static electricity are generated when the second electrostatic protection circuit PE2 is cut in the Y direction.

Further, the element substrate 10 further includes the inspection terminal 103 arranged in the second side of the element substrate 10. The inspection terminal 103 has the tip of one end that is electrically coupled to the guard line 109b extending in the Y direction along the second side through the third electrostatic protection circuit PE3. The tip of the other end of the inspection terminal 103 is electrically coupled to the inspection circuit 130 through the connection wiring 820. The inspection circuit 130 side of the connection wiring 820 is electrically coupled to the guard line 109a extending in the X direction along the third side intersecting the second side through the fourth electrostatic protection circuit PE4. Therefore, when taking out the element substrate 10 from the mother substrate W, static electricity can be dissipated to the guard line 109a through the connection wiring 820 and the fourth electrostatic protection circuit PE4, even when such static electricity are generated during the operation of cutting in the Y direction in order to separate the inspection terminal 103 from the guard lines 109b. The order of cutting is not limited to cutting the second side ahead, and the third side may be cut ahead instead. The static electricity can be dissipated to the guard line 109b through the connection wiring 820, the inspection terminals 103, and the third electrostatic protection circuit PE3, even when the static electricity are generated during the operation of cutting in the X direction along the third side in order to separate the connection wiring 820 from the guard line 109a.

That is, the manufacturing method of the mother substrate W can be provided which is capable of preventing the internal circuit or the connection wiring coupled thereto from being damaged due to static electricity even when static electricity are generated as a result of cutting of the mother substrate W. In other words, it is possible to provide the manufacturing method of the mother substrate W which can protect the element substrate 10 against any electrostatic charge generated during cutting and manufacture the element substrate 10 with favorable yield.

Note that, the process in which one of the scribe lines SLX and SLY is cut ahead, is referred to as a "primary cutting" when the mother substrate W is cut, as illustrated in FIG. 5. The process of cutting for a second time an intermediate product to take out the individual element substrate 10 is referred to as a secondary cutting, in which such intermediate product has a strip shape of the plurality of element substrates 10 being arranged in a series in a cutting direction after being parted by the process of the primary cutting. It is believed that the static electricity during cutting are more likely to be generated in the primary cutting than in the secondary cutting because a cutting stroke in the primary cutting is longer than a cutting stroke in the secondary cutting. Therefore, comparing the number of terminals of the external connection terminal 104 with that of the inspection terminal 103, in the one which includes a larger number of terminals of a higher probability of static electricity being entering, the respective electrostatic protection circuits may be arranged between the one and the guard line 109a extending in the X direction and between the one and the guard line 109b extending in the Y direction. According to such configuration, the internal circuit and connection wiring of the element substrate 10 can be protected against any generated electrostatic charge, even when the primary cutting is performed in which the one with the larger number of terminals is separated from the guard line 109 ahead. The method of scribing the mother substrate W is not limited to the dicing process, and may be a laser scribe process. The static electricity are more likely to be generated during scribing in a dry laser scribe process than that of in a wet dicing process. Accordingly, it is particularly effective in providing the electrostatic protection circuits between the guard line 109a extending in the first direction and the connection terminal and between the connection wiring coupled to the corresponding connection terminal and the guard line extending in the second direction, as described in the present exemplary embodiment.

Second Exemplary Embodiment

Electronic Apparatus

Figure 12:
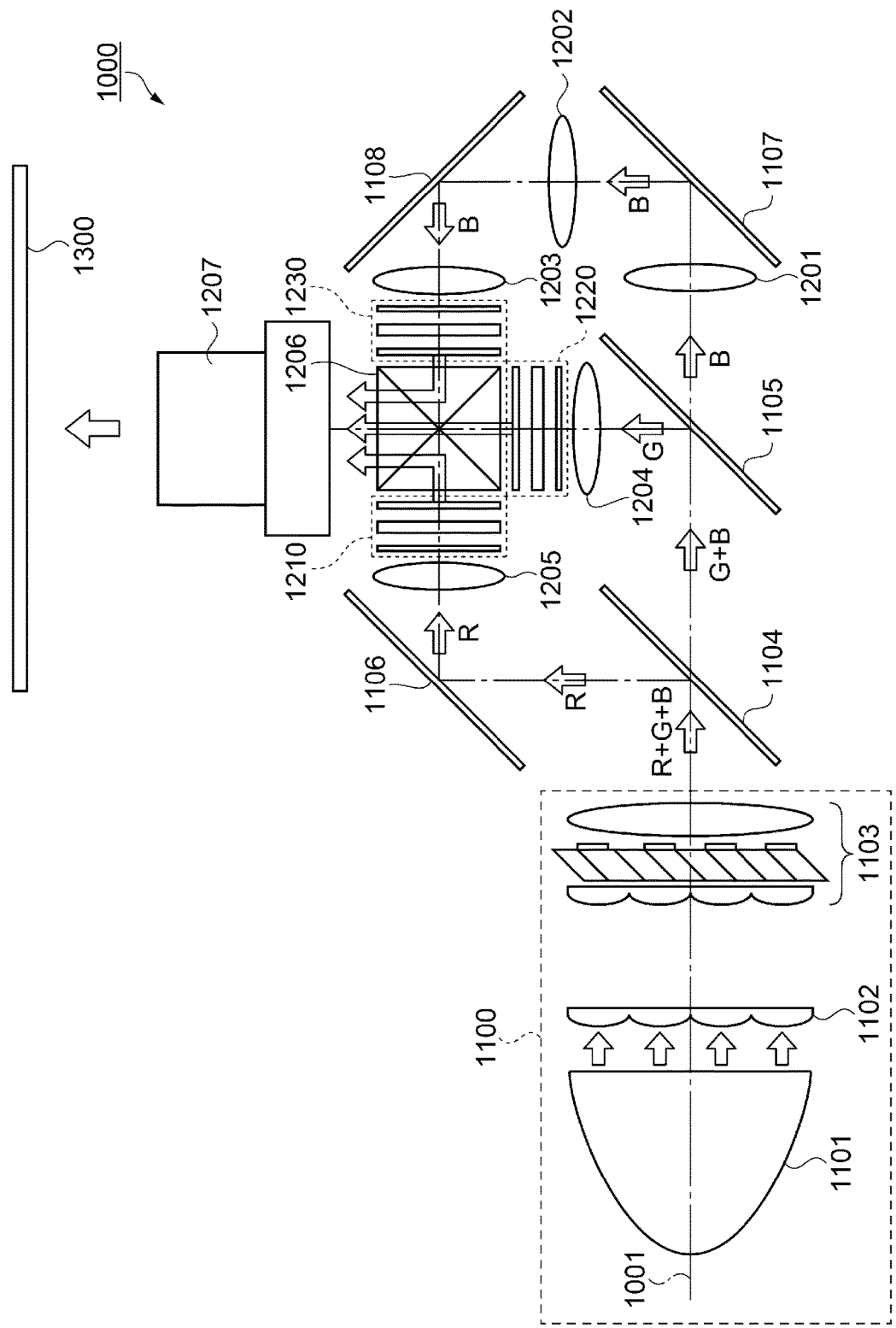
FIG. 12 is a schematic view illustrating a configuration of a projection-type display device as an electronic apparatus of Second Exemplary Embodiment.

Next, a projection-type display device will be described with reference to FIG. 12 as an example of an electronic apparatus according to the present embodiment. FIG. 12 is a schematic view illustrating a configuration of the projection-type display device as the electronic apparatus according to Second Exemplary Embodiment.

As illustrated in FIG. 12, a projection-type display device 1000 as the electronic apparatus according to the present exemplary embodiment includes a polarized light illumination apparatus 1100 disposed along a system optical axis 1001, two dichroic mirrors 1104 and 1105 as light separation elements, three reflection mirrors 1106, 1107, and 1108, five relay lenses 1201, 1202, 1203, 1204, and 1205, three transmission-type liquid crystal light bulbs 1210, 1220, and 1230 as light modulation means, a cross dichroic prism 1206 as a photosynthetic element, and a projection lens 1207.

The polarized light illumination apparatus 1100 generally includes a lamp unit 1101 as a light source including a white light source such as an extra-high pressure mercury lamp or a halogen lamp, an integrator lens 1102, and a polarization conversion element 1103.

The dichroic mirror 1104 reflects red light (R) of a polarized light flux emitted from the polarized light illumination apparatus 1100 and transmits green light (G) and blue light (B). The other dichroic mirror 1105 reflects the green light (G) transmitted by the dichroic mirror 1104 and transmits the blue light (B).

The red light (R) reflected by the dichroic mirror 1104 is reflected by the reflection mirror 1106 and subsequently is incident on the liquid crystal light bulb 1210 via the relay lens 1205.

The green light (G) reflected by the dichroic mirror 1105 is incident on the liquid crystal light bulb 1220 via the relay lens 1204.

The blue light (B) transmitted by the dichroic mirror 1105 is incident on the liquid crystal light bulb 1230 via a light guide system including three relay lenses 1201, 1202, and 1203 and two reflection mirrors 1107 and 1108.

The liquid crystal light bulbs 1210, 1220, and 1230 are each disposed to face an incident surface of each type of color light of the cross dichroic prism 1206. The color light incident on the liquid crystal light bulbs 1210, 1220, and 1230 is modulated based on video information (video signal) and is emitted toward the cross dichroic prism 1206. In this prism, four rectangular prisms are bonded together, and on inner surfaces of the prisms, a dielectric multilayer film configured to reflect red light and a dielectric multilayer film configured to reflect blue light are formed in a cross shape. Three types of color light are synthesized by these dielectric multilayer films, and light representing a color image is synthesized. The synthesized light is projected onto a screen 1300 by the projection lens 1207 as a projection optical system, and an image is enlarged and displayed.

The liquid crystal light bulb 1210 is a bulb to which the liquid crystal apparatus 100 described above is applied. A pair of light-polarizing elements disposed in a crossed- Nicols state on the incident side and the emission side of the color light of the liquid crystal apparatus 100 are disposed with a gap interposed between the pair of light-polarizing elements. The same applies to the other liquid crystal light bulbs 1220 and 1230.

With such projection-type display device 1000, a liquid crystal apparatus 100 in which electrostatic countermeasures are taken for internal circuits, is employed for the liquid crystal light bulbs 1210, 1220, and 1230. Accordingly, the projection-type display device 1000 that has resistance to static electricity and can implement operations in a stable manner, can be provided. In addition, the liquid crystal light bulbs 1210, 1220 and 1230 can be assembled without causing display defects due to static electricity in a fabrication process of the projection-type display device 1000.

Note that the polarized light illumination apparatus 1100 is not limited to the white light source, and alternatively may include an LED light source or a laser light source corresponding to the color light incident on the liquid crystal light bulb 1210, 1220 and 1230.

The present disclosure is not limited to the exemplary embodiments described above, and various modifications and improvements may be added to the exemplary embodiments described above. Such modifications are described below.

Modified Example 1

In the above-described First Exemplary Embodiment, from the perspective of electrically coupling a guard line 109*a* to a guard line 109*b*, the guard line 109*a* and the guard line 109*b* may be formed in a same wiring layer on a base substrate 10*s*, however, it is not limited to the above, and may be formed in different wiring layers on the base substrate 10*s*. Furthermore, the guard line 109*a* and the guard line 109*b* may not necessarily be electrically coupled to each other as long as the configuration is capable of causing static electricity to be dissipated to each of the guard lines 109*a* and the guard lines 109*b*.

Modified Example 2

In the above-described First Exemplary Embodiment, a first electrostatic protection circuit PE1, a second electrostatic protection circuit PE2, a third electrostatic protection circuit PE3, and a fourth electrostatic protection circuit PE4 may be formed in the same wiring layer on the base substrate 10*s* and may be formed as resistive elements having similar resistance values, but not limited thereto. It may be sufficient that the first electrostatic protection circuit PE1, the second electrostatic protection circuit PE2, the third electrostatic protection circuit PE3, and the fourth electrostatic protection circuit PE4 may be formed so as to have the greater resistance value than that of connection wiring lines 820, 830, 840, and 850, and may not be necessarily formed in the same wiring layer. In addition, the first electrostatic protection circuit PE1, the second electrostatic protection circuit PE2, the third electrostatic protection circuit PE3, and the fourth electrostatic protection circuit PE4 are not limited to being an resistive element, and alternatively may be reactance elements such as inductance elements and capacitance elements. Furthermore, all the first electrostatic protection circuit PE1, the second electrostatic protection circuit PE2, the third electrostatic protection circuit PE3, and the fourth electrostatic protection circuit PE4 may not necessarily be the same functional element. Alternatively, the resistive elements and reactance elements may be selected or combined thereof to be employed as appropriate.

Modified Example 3

An electro-optical device to which a substrate for the electro-optical device according to an aspect of the present disclosure can be applied, is not limited to the liquid crystal apparatus 100 described in First Exemplary Embodiment. For example, the electro-optical device can also be applied to a self-emitting display device provided with a light emitting element in a pixel P.

Modified Example 4

The electronic apparatus to which the liquid crystal apparatus 100 of First Exemplary Embodiment is applied, is not limited to the projection-type display device 1000 of Second Exemplary Embodiment. For example, the electronic apparatus can be used suitably as a projection-type head-up display (HUD), a direct viewing-type head-mounted display (HMD), and a display unit of an information terminal device such as an electronic book, a personal computer, a digital still camera, a liquid crystal television, a view finder-type or a monitor direct viewing type video recorder, a car navigation system, an electronic note book, and POS.

Contents derived from the exemplary embodiments will be described below.

A substrate for an electro-optical device according to an aspect of the present disclosure is a substrate for an electro-optical device including a plurality of individual substrates arranged in a first direction and a second direction intersecting the first direction. The plurality of individual substrates each includes an internal circuit and a first coupling terminal arranged on a first side of the individual substrate. One end side of the first coupling terminal is electrically coupled to a first common wiring extending along the first side via a first electrostatic protection circuit, and another end side of the first coupling terminal is electrically coupled to the internal circuit via a first coupling wiring. The first coupling wiring is electrically coupled to a second common wiring that extends along a second side intersecting the first side via a second electrostatic protection circuit.

According to the configuration of the aspect of the disclosure, the first electrostatic protection circuit is provided between the first coupling terminal and the first common wiring, and the second electrostatic protection circuit is provided between the first coupling wiring coupling the first coupling terminal and the internal circuit and the second common wiring. Thus, when the individual substrate is taken out from the substrate for an electro-optical device, even when static electricity is generated when cutting along the first side to separate the first coupling terminal from the first common wiring, the static electricity can be dissipated to the second common wiring via the first coupling wiring and the second electrostatic protection circuit. The order of cutting is not limited to cutting the first side first, and the second side may be cut first. Thus, even when static electricity is generated when cutting along the second side to separate the first coupling terminal from the second common wiring, the static electricity can be dissipated to the first common wiring via the first coupling wiring, the first coupling terminal, and the first electrostatic protection circuit. That is, even when static electricity is generated in association with the cutting of the substrate for an electro-optical device, it is possible to provide the substrate for an electro-optical device capable of preventing electrostatic breakdown of the internal circuit or the first coupling wiring coupled to the internal circuit.

In the substrate for an electro-optical device or the like described above, the plurality of individual substrates each further includes an a second coupling terminal arranged on the second side of the individual substrate. One end side of the second coupling terminal is electrically coupled to the second common wiring extending along the second side via a third electrostatic protection circuit, and another end side of the second coupling terminal is electrically coupled to the internal circuit via a second coupling wiring. The second coupling wiring is electrically coupled to a third common wiring that extends along a third side intersecting the second side via a fourth electrostatic protection circuit.

According to this configuration, when the individual substrate is taken out from the substrate for an electro-optical device, even when static electricity is generated when cutting along the second side to separate the second coupling terminal from the second common wiring, the static electricity can be dissipated to the third common wiring via the second coupling wiring and the fourth electrostatic protection circuit. The order of cutting is not limited to cutting the second side first, and the third side may be cut first. Thus, even when static electricity is generated when cutting along the third side to separate the second coupling wiring from the third common wiring, the static electricity can be dissipated to the second common wiring via the second coupling wiring, the second coupling terminal, and the third electrostatic protection circuit.

In the substrate for an electro-optical device described above, the first coupling terminal is an external coupling terminal configured to couple to an external circuit, and the second coupling terminal is an inspection terminal configured to inspect the internal circuit.

According to this configuration, when the substrate for an electro-optical device is cut to take out the individual substrate, even when static electricity enters the first coupling terminal serving as the external coupling terminal or the second coupling terminal serving as the inspection terminal, the internal circuit coupled to these terminals can be protected from static electricity.

In the substrate for an electro-optical device described above, the first common wiring and the second common wiring may be electrically coupled.

According to this configuration, the static electricity generated by handling the substrate for an electro-optical device can be dissipated to the first common wiring and the second common wiring before the substrate for an electro-optical device is cut to take out the individual substrates. In other words, the coupling wiring and the internal circuit coupled to these common wirings can be protected from static electricity.

In the substrate for an electro-optical device described above, the first common wiring, the second common wiring, and the third common wiring may be electrically coupled.

According to this configuration, the static electricity generated by handling the substrate for an electro-optical device can be dissipated to the first common wiring, the second common wiring, and the third common wiring before the substrate for an electro-optical device is cut to take out the individual substrate. In other words, the coupling wiring and the internal circuit coupled to these common wirings can be protected from static electricity.

In the substrate for an electro-optical device described above, at least one of the first electrostatic protection circuit, the second electrostatic protection circuit, the third electrostatic protection circuit, and the fourth electrostatic protection circuit may be a resistive element, and a resistance value of the resistive element may be greater than a resistance value of the first coupling wiring or the second coupling wiring.

According to this configuration, static electricity entering the first coupling terminal or the second coupling terminal can be consumed by the resistance element. That is, the internal circuit and coupling wirings coupled to the internal circuit can be protected from static electricity by any of the first electrostatic protection circuit, the second electrostatic protection circuit, the third electrostatic protection circuit, and the fourth electrostatic protection circuit.

In the substrate for an electro-optical device described above, the resistive element is formed on a base material in a same layer using a same material as those of a semiconductor layer of a transistor included in the internal circuit.

According to this configuration, the material constituting the semiconductor layer has high electrical resistance compared to that of the wiring coupled to the transistor, making it possible to constitute a resistive element suitable for an electrostatic protection circuit.

In the substrate for an electro-optical device described above, the first common wiring, the second common wiring, and the third common wiring are formed on a base material in a same layer using a same material as those of a gate electrode of a transistor included in the internal circuit.

According to this configuration, a material having a high electrical resistance compared to that of the wiring coupled to the transistor may be used as the material constituting the gate electrode, making it possible to establish a material configuration suitable for the common wirings.

An individual substrate according to an aspect of the present disclosure includes an internal circuit provided on a base material, a first coupling terminal arranged on a first side of the base material, a first coupling wiring causing the internal circuit and the first coupling terminal to be electrically coupled, a first electrostatic protection circuit which is arranged between the first coupling terminal and the first side, one end side of which is electrically coupled to the first coupling terminal, and another end of which is cut at the first side, and a second electrostatic protection circuit which is arranged on a second side intersecting the first side, one end side of which is electrically coupled to the first coupling wiring, and another end of which is cut at the second side.

According to the configuration of the aspect of the disclosure, with respect to the first coupling wiring coupled to the internal circuit, the first electrostatic protection circuit is provided on the first side and the second electrostatic protection circuit is provided on the second side that intersects with the first side, and thus an individual substrate can be provided that is capable of protecting the internal circuit from static electricity by the first electrostatic protection circuit or the second electrostatic protection circuit even when static electricity is generated when cutting is performed along one of the first side and the second side to manufacture the individual substrate.

An electro-optical device according to an aspect of the present disclosure includes an individual substrate taken out from the substrate for an electro-optical device described above, a counter substrate, and an electro-optical element arranged between the individual substrate and the counter substrate.

According to the configuration of the aspect of the disclosure, since an individual substrate in which the internal circuit is protected from static electricity in the manufacturing process of the individual substrate is used, electrical defects in the internal circuit of the individual substrate are reduced, and an electro-optical device capable of stable operation can be provided.

Another electro-optical device according to an aspect of the disclosure includes the individual substrate described above, a counter substrate, and an electro-optical element arranged between the individual substrate and the counter substrate.

According to the configuration of the aspect of the disclosure, since an individual substrate in which the internal circuit is protected from static electricity is used, electrical defects in the internal circuit of the individual substrate are reduced, and an electro-optical device capable of stable operation can be provided.

An electronic apparatus according to an aspect of the disclosure includes the above-described electro-optical device.

According to the configuration of the aspect of the disclosure, it is possible to provide an electronic apparatus having high operation reliability.

A method for manufacturing a substrate for an electro-optical device according to an aspect of the present disclosure is a method for manufacturing a substrate for an electro-optical device including a plurality of individual substrates arranged in a first direction and a second direction intersecting the first direction. The plurality of individual substrates each includes an internal circuit and a plurality of first coupling terminals arranged on a first side of the individual substrate. One end side each of the plurality of first coupling terminals is electrically coupled to a first common wiring extending along the first side via a first electrostatic protection circuit, and another end side of each of the plurality of first coupling terminals is electrically coupled to the internal circuit via a first coupling wiring. The first coupling wiring is electrically coupled to a second common wiring that extends along a second side intersecting the first side via a second electrostatic protection circuit. The method includes cutting the first electrostatic protection circuit along the second direction and cutting the second electrostatic protection circuit along the first direction to take out the individual substrate.

According to this configuration, when the individual substrate is taken out from the substrate for an electro-optical device, even when static electricity is generated when the first electrostatic protection circuit is cut along the second direction, the static electricity can be dissipated to the second common wiring via the first coupling wiring and the second electrostatic protection circuit. The order of cutting is not limited to cutting the first electrostatic protection circuit first, and the second electrostatic protection circuit may be cut first. Thus, even when static electricity is generated when the second electrostatic protection circuit is cut along the second side, the static electricity can be dissipated to the first common wiring via the first coupling wiring, the first coupling terminal, and the first electrostatic protection circuit. In other words, even when static electricity is generated in association with the cutting of the substrate for an electro-optical device, it is possible to provide a method for manufacturing a substrate for an electro-optical device capable of preventing electrostatic breakdown of the internal circuit or the first coupling wiring coupled to the internal circuit. In other words, it is possible to provide a method for manufacturing a substrate for an electro-optical device capable of protecting the individual substrate from static electricity generated during cutting and manufacturing the individual substrate with favorable yield.

What is claimed is:

1. A substrate for an electro-optical device comprising:
a plurality of individual substrates arranged in a first direction and a second direction intersecting the first direction, wherein
at least one individual substrate among the plurality of individual substrates includes an internal circuit, a first coupling terminal arranged at a first side of the individual substrate, a plurality of second coupling terminals arranged at a second side of the individual substrate intersecting the first side, and a plurality of third coupling terminals arranged at a third side of the individual substrate intersecting the first side and opposite to the second the internal circuit including a peripheral circuit,
one end side of the first coupling terminal is electrically coupled, via a first electrostatic protection circuit, to a first common wiring extending along the first side, and another end side of the first coupling terminal is electrically coupled, via a first coupling wiring, to the internal circuit,
the first coupling terminal is an external coupling terminal configured to couple to an image signal supply circuit,
each of the second coupling terminals is an inspection terminal configured to inspect the internal circuit, and
each of the third coupling terminals is an inspection terminal configured to inspect the internal circuit such that an input signal provided to the second coupling terminals corresponds to an output signal output by the third coupling terminals.

2. The substrate for an electro-optical device according to claim 1, wherein
one end side of the second coupling terminal is electrically coupled, via a third electrostatic protection circuit, to the second common wiring extending along the second side, and another end side of the second coupling terminal is electrically coupled, via a second coupling wiring, to the internal circuit, and
the second coupling wiring is electrically coupled, via a fourth electrostatic protection circuit, to a third common wiring extending along a third side intersecting the second side.

3. The substrate for an electro-optical device according to claim 1, wherein
the first common wiring and the second common wiring are electrically coupled.

4. The substrate for an electro-optical device according to claim 2, wherein
the first common wiring, the second common wiring, and the third common wiring are electrically coupled.

5. The substrate for an electro-optical device according to claim 1, wherein
at least one of the first electrostatic protection circuit, the second electrostatic protection circuit, the third electrostatic protection circuit, and the fourth electrostatic protection circuit is a resistive element, and a resistance value of the resistive element is greater than a resistance value of the first coupling wiring or the second coupling wiring.

6. The substrate for an electro-optical device according to claim 5, wherein,
the resistive element is formed, on a base material, in a same layer using a same material as a semiconductor layer of a transistor included in the internal circuit.

7. The substrate for an electro-optical device according to claim 5, wherein,
the first common wiring, the second common wiring, and the third common wiring are formed, on a base material, in a same layer using a same material as a gate electrode of a transistor included in the internal circuit.

8. An individual substrate comprising:
an internal circuit provided on a base material, the internal circuit including a peripheral circuit;
a first coupling terminal arranged at a first side of the base material;
a plurality of second coupling terminals arranged at a second side of the base material intersecting the first side;
a plurality of third coupling terminals arranged at a third side of the individual substrate intersecting the first side and opposite to the second side;
a first coupling wiring electrically coupling the internal circuit and the first coupling terminal;
a first electrostatic protection circuit that is arranged between the first coupling terminal and the first side, and that is electrically coupled, on one end side thereof, to the first coupling terminal; and
a second electrostatic protection circuit that is arranged at the second side of the base material, and that is electrically coupled, on one end side thereof, to the first coupling wiring, wherein
the first coupling terminal is an external coupling terminal configured to couple to an image signal supply circuit,
each of the second coupling terminals is an inspection terminal configured to inspect the internal circuit, and
each of the third coupling terminals is an inspection terminal configured to inspect the internal circuit such that an input signal provided to the second coupling terminals corresponds to an output signal output by the third coupling terminals.

9. An electro-optical device comprising:
an individual substrate taken out from the substrate for an electro-optical device according to claim 1;
a counter substrate; and
an electro-optical element arranged between the individual substrate and the counter substrate.

10. An electro-optical device comprising:
the individual substrate according to claim 8;
a counter substrate; and
an electro-optical element arranged between the individual substrate and the counter substrate.

11. An electronic apparatus comprising:
the electro-optical device according to claim 9.

12. A method for manufacturing a substrate for an electro-optical device, the substrate including a plurality of individual substrates arranged in a first direction and a second direction intersecting the first direction,
the individual substrate including an internal circuit, a plurality of first coupling terminals arranged at a first side of the individual substrate, a plurality of second coupling terminals arranged at a second side of the individual substrate intersecting the first side, and a plurality of third coupling terminals arranged at a third side of the individual substrate intersecting the first side and opposite to the second side, the internal circuit including a peripheral circuit,
one end side of each of the plurality of first coupling terminals being electrically coupled, via a first electrostatic protection circuit, to a first common wiring extending along the first side, and another end side of each of the plurality of first coupling terminals being electrically coupled, via a first coupling wiring, to the internal circuit,
the first coupling wiring being electrically coupled, via a second electrostatic protection circuit, to a second common wiring extending along the second side of the individual substrate,
each of the first coupling terminals being an external coupling terminal configured to couple to an image signal supply circuit,
each of the second coupling terminals being an inspection terminal configured to inspect the internal circuit, and
each of the third coupling terminals being an inspection terminal configured to inspect the internal circuit such that an input signal provided to the second coupling terminals corresponds to an output signal output by the third coupling terminals, the method comprising:
cutting the first electrostatic protection circuit along the second direction and cutting the second electrostatic protection circuit along the first direction to take out the individual substrate.

* * * * *